(12) United States Patent
Perng et al.

(10) Patent No.: US 7,870,398 B2
(45) Date of Patent: Jan. 11, 2011

(54) INTEGRITY ASSURANCE OF QUERY RESULT FROM DATABASE SERVICE PROVIDER

(75) Inventors: Chang-shing Perng, Goldens Bridge, NY (US); Haixun Wang, Irvington, NY (US); Jian Yin, Bronx, NY (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 1022 days.

(21) Appl. No.: 11/626,847

(22) Filed: Jan. 25, 2007

(65) Prior Publication Data

US 2008/0183656 A1 Jul. 31, 2008

(51) Int. Cl.
*G06F 12/14* (2006.01)
*G06F 7/00* (2006.01)

(52) U.S. Cl. ............... 713/193; 713/189; 713/190; 713/194; 707/687; 707/688; 707/690; 707/697; 707/698; 707/699; 707/700

(58) Field of Classification Search ........... 713/193, 713/194, 189, 190; 707/3–6, 687, 688, 690, 707/697–700, 758
See application file for complete search history.

(56) References Cited

U.S. PATENT DOCUMENTS 7,152,165 B1 * 12/2006 Maheshwari et al. ....... 713/193

2002/0104002 A1 * 8/2002 Nishizawa et al. ......... 713/168
2006/0248052 A1 * 11/2006 Zurek .......................... 707/3

OTHER PUBLICATIONS

Balancing Confidentiality and Efficiency in Untrusted relational DBMSs by Daminai et al; Date: Oct. 27-31, 2003; Publisher: ACM.*
Executing SQL over Encrypted Data in the Databse Service Provider Model by Hacimugus et al; Date: Jun. 2-6, 2002; Publisher: ACM.*

* cited by examiner

*Primary Examiner*—Taghi T Arani
*Assistant Examiner*—Madhuri Herzog
(74) *Attorney, Agent, or Firm*—Ido Tuchman; Mark Wardas

(57) ABSTRACT

A method, system and computer program product for confirming the validity of data returned from a data store. A data store contains a primary data set encrypted using a first encryption and a secondary data set using a second encryption. The secondary data set is a subset of the primary data set. A client issues a substantive query against the data store to retrieve a primary data result belonging to the primary data set. A query interface issues at least one validating query against the data store. Each validating query returns a secondary data result belonging to the secondary data set. The query interface receives the secondary data result and provides a data invalid notification if data satisfying the substantive query included in an unencrypted form of the secondary data result is not contained in an unencrypted form of the primary data result.

20 Claims, 7 Drawing Sheets

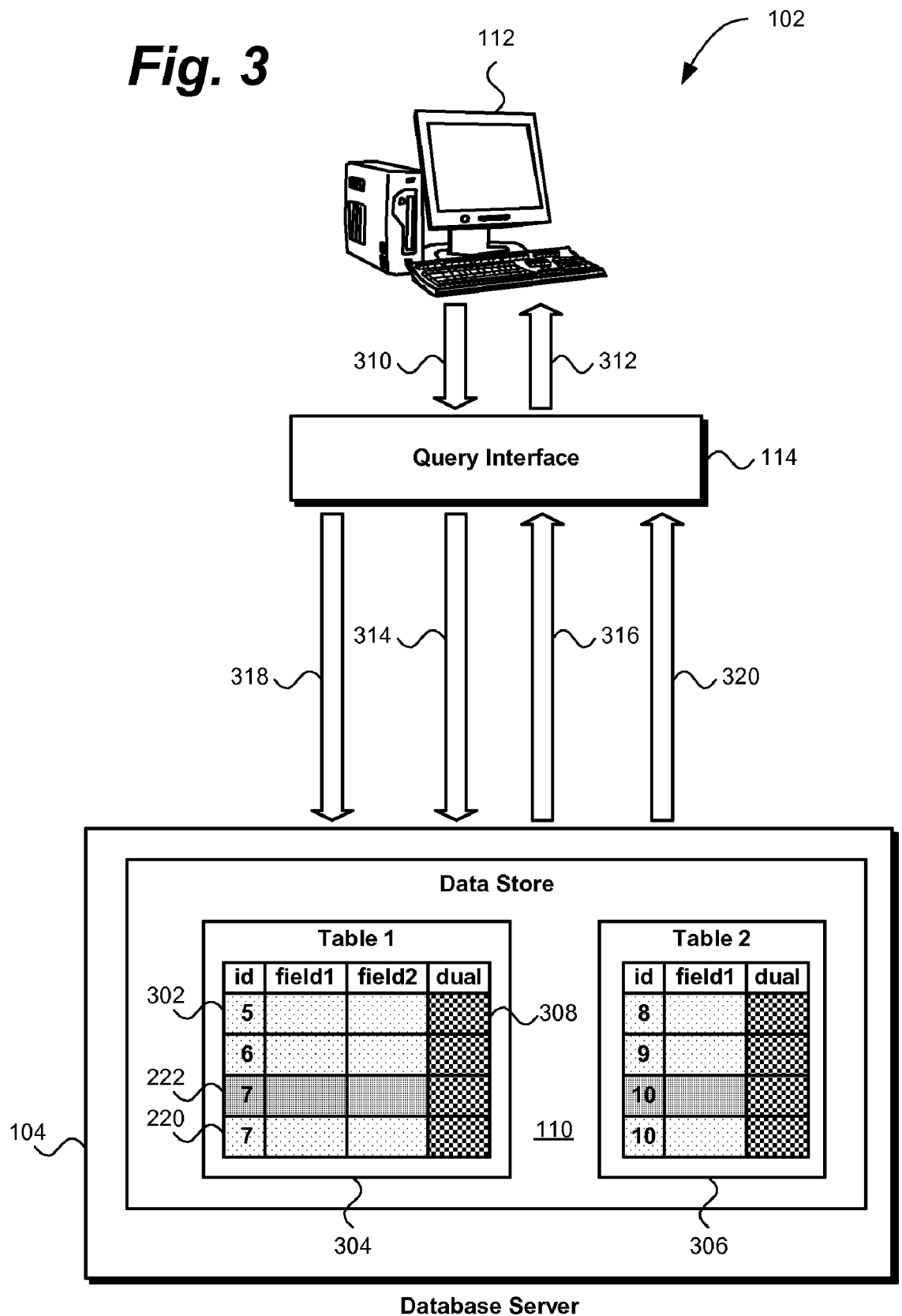

INTEGRITY ASSURANCE OF QUERY RESULT FROM DATABASE SERVICE PROVIDER

FIELD OF THE INVENTION

The present invention relates generally to databases. More specifically, the present invention relates to techniques for ensuring the integrity of queries performed against a database outsourced to a third party.

BACKGROUND OF THE INVENTION

Database management systems (DBMS's) are systems designed to store and manage data. DBMS's may receive data to be stored and may allow updating or deleting previously stored data. Of the resulting stored data, DBMS's provide functionality to retrieve specific data relevant to a particular purpose. Many possible types of data may be stored at a DBMS, and the data may be structured in many possible ways. Notably, the quantity of data located at a DBMS may be large. Databases containing gigabytes of data are common, and databases containing terabytes of data are known in the art. Conversely, using a DBMS even for comparatively small quantities of data may be advantageous because the functionality provided by the DBMS may be applied to that data.

DBMS's beneficially allow a wide variety of organizations to effectively and accurately manage their data. The use of DBMS's by businesses is particularly widespread. Many business goals are advanced by effectively managing data, a task which DBMS's are specialized to achieve. For example, a business may increase profitability by maintaining accurate information about customers in a DBMS. DBMS's also benefit organizations which do not have a profit motive, such as educational institutions, research facilities and government agencies. Furthermore, computer program products, computing systems and other technological processes are frequently coupled to a DBMS in order to manage relevant data. This coupling is particularly widespread in Internet-based applications because environments known in the art for executing such applications typically offer limited capabilities for maintaining state information and persistent data.

To retrieve data located at a DBMS, a system may submit a query to the DBMS. A query is a request to transmit specific data located at a DBMS to the system making the request. A query may be submitted to a DBMS in order to retrieve data relevant to a specific task. Querying is important because only a fraction of the total data located at a DBMS is relevant to most tasks; querying allows retrieving this fraction relatively quickly. A querying operation may comprise selecting, from the entire body of stored data, only that subset of the data which fulfills specific criteria. Specifically, data matching the criteria are selected and data not matching the criteria are not selected. A wide variety of criteria may be used in queries. One of the most common criteria is that a specific element within the data must contain a specific value. Another possible criterion is that a specific element must contain a value falling within a specified range. A range criterion may include an upper bound, a lower bound, or both. Additionally, Boolean logic may be used to combine multiple criteria so that the query returns only a subset of the data for which the Boolean expression evaluates to True.

Queries which select data matching one or more logical condition predicates are known in the art as identity queries. It is noted that not all queries are identity queries. For example, many database systems known in the art allow selecting all records for which a certain element matches the result of a validating query, known as a subquery. Such a query, although it may be accepted by a specific DBMS, is not an identity query. Those skilled in the art will appreciate that while such complex queries may be useful in certain cases, they typically take a longer time to execute and require more computing resources than identity queries. Furthermore, queries which are not identity queries can frequently be rewritten as one or more identity queries which retrieve the same data.

The data stored at a DBMS does not need to be static. In fact, an advantageous feature of DBMS's is that data not only may change, but generally may do so in real time. To allow data to be dynamic, most DBMS's known in the art provide functionality to manipulate the data stored at a DBMS via inserting, updating and deleting operations. An inserting operation causes new data to be stored at the DBMS. An updating operation modifies existing data stored at the DBMS such that existing values are replaced by updated values. A deleting operation removes data from the DBMS which is presently stored there but is no longer desired.

One type of database commonly used in the art is the relational database, also known as an RDBMS. In a relational database, a table stores data having a common structure and representing a similar type of entity. Specifically, a table contains units of data known in the art as tuples. It is noted that tuples are alternatively known as records or rows; all three terms have an identical meaning. The number of tuples stored in a table may at one extreme be very large, and may at the other extreme be zero. A tuple frequently contains a coherent, atomic unit of data, often corresponding to a single entity. However, those skilled in the art will appreciate that many exceptions to this broad guideline exist. Each tuple contains one or more fields, each of which is configured to contain data of a specified type. Common types of fields include integers, real numbers (often having a defined number of digits to the right of a decimal point), text (often subject to a maximum number of characters) and Booleans (values which may be either logically True or False.) A field may be configured to allow a special value called Null which indicates the non-existence of a value for that field. Generally, all tuples within a table will include the same fields, although the values of the fields generally vary from tuple to tuple. It is emphasized, however, that not all DBMS's follow this relational paradigm. Other types of DBMS's known in the art include object-oriented databases and hierarchical databases.

Relational databases may be queried using a specialized programming language called Structured Query Language, or SQL. It is noted that other querying languages exist in the art. Furthermore, even among those DBMS's known in the art which accept SQL queries, noticeable differences may exist in SQL syntax from DBMS to DBMS.

DBMS's known in the art generally require sophisticated hardware and software. Furthermore, effective administration of a DBMS generally requires a high degree of expertise. Many organizations which may benefit from the data management functionality of DBMS's lack these resources.

Database outsourcing can help bridge this gap. Database outsourcing is the contracting of an organization's database management tasks to an outside database service provider. This beneficially allows organizations to realize the benefits of DBMS's while decreasing the need for in-house expertise, hardware and software. Database outsourcing is therefore beneficial for organizations having limited capabilities for managing their own data. Even when an organization possesses database management expertise, database outsourcing confers many other benefits. In particular, database outsourcing may reduce costs. Database outsourcing may also help organizations to focus on their core tasks.

Database outsourcing is becoming more feasible from a cost standpoint. Historically, transmitting data over wide distances has been expensive. This fact encouraged locating DBMS's in close physical proximity to their users, thus discouraging database outsourcing. However, during a recent five-year period, the cost to transmit a quantity of data over a large geographic area decreased by approximately 75 percent. As a result, the costs of database outsourcing have fallen while the benefits are as advantageous as ever.

For database outsourcing to succeed, organizations must be ensured of the integrity of queries performed against the outsourced database. Data authenticity—the fact that the data returned in response to a query is the same data that was transmitted to the database—must be guaranteed. Query completeness—the fact that all records which should be matched by a query are in fact returned—is critical. Database outsourcing presents other challenges as well. The privacy of data must be ensured. Ideally, even the outside database service provider itself should have no access to the plaintext (unencrypted) version of the data stored therewith. Performance, scalability and ease of use, which have traditionally been important issues in DBMS's, have now gained a new dimension in the database outsourcing paradigm.

Furthermore, it is important to ensure query integrity without incurring unduly high costs. For example, some techniques in the prior art for ensuring query integrity involve computationally intensive security schemes. Because a database query typically requires only a fraction of a second to execute, such techniques may add significant overhead. Other prior art techniques involve storing data at a client to assist in verifying query integrity. However, such techniques inherently require data management capability at the client side. For many clients, such as Personal Digital Assistants (PDA's), mobile phones and other thin clients, local data management may not be possible due to storage limitations. More generally, local data storage is precisely what database outsourcing seeks to minimize. Therefore, the utility of this category of prior art techniques is inherently limited.

Database outsourcing is facilitated by encryption. Encryption is a set of techniques known in the art for modifying data so that it is difficult to determine the unmodified data even if an entity (such as an outside database service provider) has access to the modified data. The original, unmodified data input to an encryption algorithm is known in the art as plaintext.

Notably, encryption does not attempt to make it impossible to determine the content of plaintext based solely on its encrypted form. In fact, all encryption techniques known in the art can be defeated if unlimited computing resources are available. Instead, encryption attempts to make it computationally infeasible to determine the content of plaintext based solely on its encrypted form. This means that the amount of resources required to determine the plaintext data from its encrypted form exceeds the value of the plaintext data. For example, suppose that the maximum potential loss resulting from unauthorized access to a given plaintext data set is $10,000. Suppose that the plaintext data are encrypted in a manner such that the expected value of the quantity of computing power required to reverse the encryption without authorization is 1,000 processor years. Suppose also that the cost of 1,000 processor years of computing power is $500,000. It is computationally infeasible to reverse the encryption in this case because even if an entity is unethical, a business case cannot be made for reversing the encryption without authorization.

Many encryption techniques known in the art employ a secret key to encrypt plaintext data. Specifically, plaintext and the secret key are input to an encryption function. The result of the encryption function is the encrypted form of the plaintext data. If an entity has access to the secret key, the entity may reverse the encryption by inputting the encrypted data and the secret key may be input to a decryption function. If an entity does not have access to the secret key, it is computationally infeasible for the entity to obtain the plaintext data based on the encrypted data.

Another notable type of encryption is one way hashing. One way hashing may be achieved by employing a one way hash function. A one way hash function may receive as input data having a variable length and may return as a result data having a fixed length. A one way hash function may also receive a secret key as input. If an entity does not have access to the secret key, it is computationally infeasible for the entity to determine whether a specific result was generated from specific input data. One way hash functions are determinate. Accordingly, for the same one way hash function, the same input value and the same key will always yield the same result value. For most one way hash functions, it is computationally infeasible to determine an input value for which the function will output a particular result value. For many one way hash functions, it is computationally infeasible to find two different input values for which the hash function returns the same result.

SUMMARY OF THE INVENTION

In light of the above-mentioned limitations of the prior art, one exemplary aspect of the present invention is a method for confirming the validity of data returned from a data store. The method includes an encrypting operation to encrypt a primary data set using a first encryption. A storing operation stores the encrypted primary data set at the data store. Another encrypting operation encrypts a secondary data set using a second encryption, the secondary data set being a subset of the primary data set. Another storing operation stores the encrypted secondary data set at the data store. A further encrypting operation encrypts a substantive query configured to return a primary data result belonging to the primary data set. The encrypted substantive query is issued against the data store. At least one validating query is also issued against the data store. Each validating query is configured to return a secondary data result belonging to the secondary data set. The secondary data result is then decrypted. A data invalid notification is provided if any definable unit of data (that is, data satisfying the substantive query) included in an unencrypted form of the secondary data result is not contained in an unencrypted form of the primary data result.

Another exemplary aspect of the invention is a system for confirming the validity of data returned from a data store. The system includes a data store and at least one client. The data store is configured to store a primary data set encrypted using a first encryption and a secondary data set using a second encryption. The secondary data set is a subset of the primary data set. The client is configured to issue a substantive query against the data store to retrieve a primary data result belonging to the primary data set. The system further includes a query interface. The query interface is configured to issue at least one validating query against the data store. Each validating query is configured to return a secondary data result belonging to the secondary data set. The query interface receives the secondary data result and provides a data invalid notification if any definable unit of data (that is, data satisfying the substantive query) included in an unencrypted form of the secondary data result is not contained in an unencrypted form of the primary data result.

Yet another exemplary aspect of the present invention is a computer program for confirming the validity of data returned from a data store. The computer program includes code to: encrypt a primary data set using a first encryption, store the encrypted primary data set at the data store, and encrypt a secondary data set using a second encryption, and store the encrypted secondary data set at the data store. The secondary data set is a subset of the primary data set. The computer program also encrypts a substantive query, the substantive query is configured to return at least one primary tuple belonging to the primary data set. The computer program issues the encrypted substantive query against the data store, and at least one validating query against the data store. The validating query is configured to return at least one secondary tuple belonging to the secondary data set. The secondary tuple is decrypted and the computer program provides a data invalid notification if the decrypted form of the secondary tuple satisfying the substantive query is not contained in a decrypted form of any of the primary data results.

The foregoing and other features, utilities and advantages of the invention will be apparent from the following more particular description of various embodiments of the invention as illustrated in the accompanying drawings.

BRIEF DESCRIPTION OF THE SEVERAL VIEWS OF THE DRAWINGS

The invention herein described, by way of example only, with reference to the accompanying drawings, wherein:

FIG. 3 provides additional detail about an exemplary system for database outsourcing as contemplated by the present invention.

DETAILED DESCRIPTION OF THE INVENTION

Figure 1:
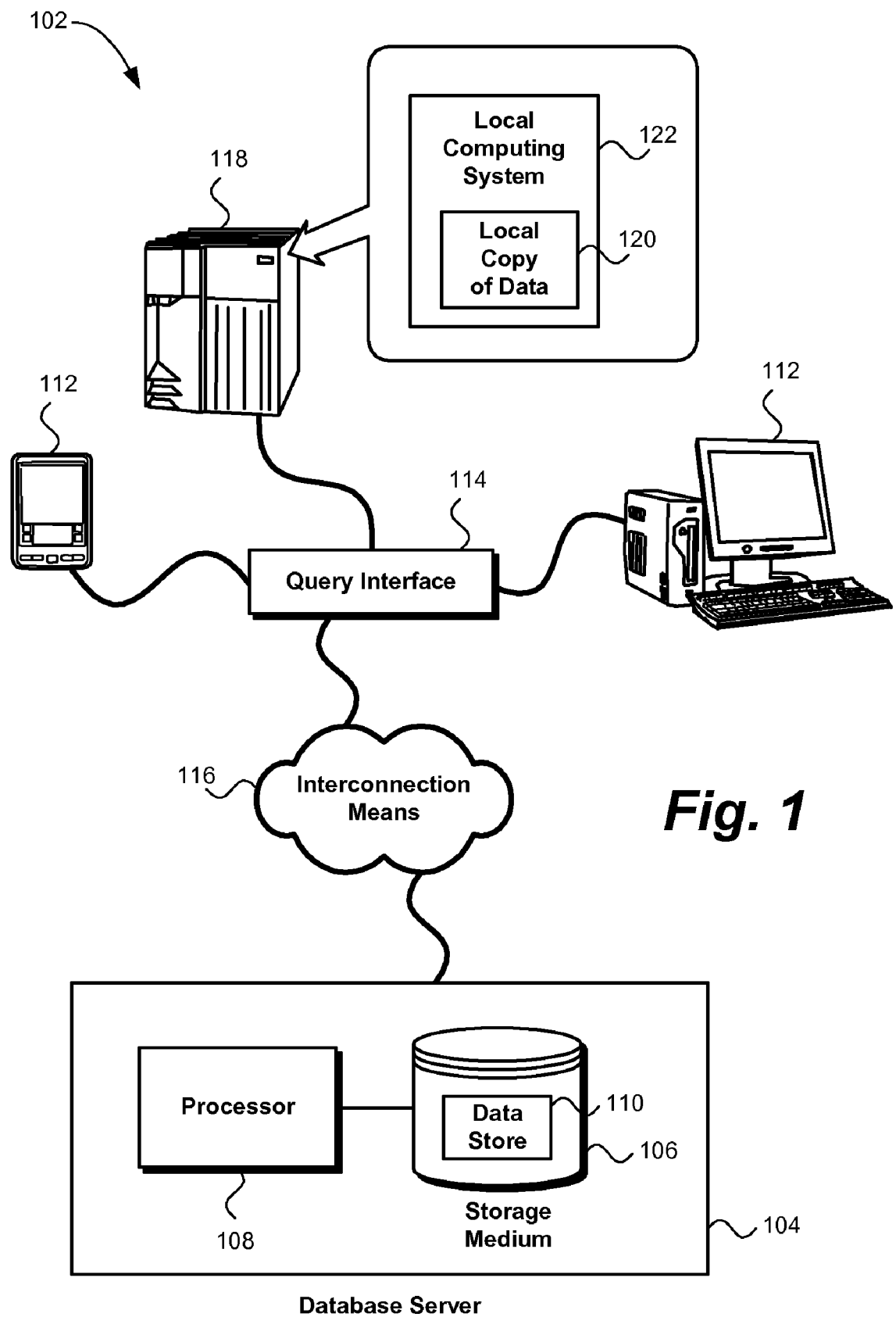
FIG. 1 shows an exemplary system for database outsourcing as contemplated by the present invention.

The following description details how the present invention is employed to ensure the integrity of queries performed against a database outsourced to a third party. Throughout the description of the invention reference is made to FIGS. 1-6. When referring to the figures, like structures and elements shown throughout are indicated with like reference numerals.

FIG. 1 shows an exemplary system 102 for database outsourcing as contemplated by the present invention. The system may generally follow a client-server model. Specifically, the system may include one or more database servers 104 to which one or more clients 112 may issue queries.

A query interface 114 may manipulate queries issued by the one or more clients and query results returned by the one or more database servers. This manipulation may comprise encrypting queries and decrypting query results. The query interface may issue validating queries to a database server. The query interface may analyze the results of the validating queries, in conjunction with the results of the queries issued by the one or more clients, to determine the integrity of query results. The system may be configured in a manner which minimizes storage overhead and query overhead.

The system includes one or more database servers 104. A database server may be any of a wide variety of systems configured to store and manage data. A database server may be implemented in hardware, in software or in a combination thereof. In an embodiment of the present invention, each database server implements a relational database management system (RDBMS.) The RDBMS may be a database such as DB2®, MySQL® or Microsoft® Office Access. DB2 is a registered trademark of International Business Machines Corporation, Armonk, N.Y., United States in the United States and other countries. MySQL is a registered trademark of MySQL AB, Uppsala, Sweden in the United States and other countries. Microsoft is a registered trademark of Microsoft Corporation, Redmond, Wash., United States in the United States and other countries.

Each database server 104 may be a general purpose computer. The computer, even if originally manufactured for a general purpose, may be configured specifically to process large quantities of data. The computer may be a desktop computer based on a general purpose operating system such as Windows® or Linux®. Windows is a registered trademark of Microsoft Corporation, Redmond, Wash., United States. Linux is the registered trademark of Linus Torvalds in the U.S. and other countries. The computer may also be a server-class computer based on an operating system such as z/OS® or AIX®. z/OS and AIX are registered trademarks of International Business Machines Corporation, Armonk, N.Y., United States in the United States and other countries. A database server 104 may also be manufactured for the specific purpose of storing and managing data.

Each database server 104 may comprise a storage medium 106 configured to store data in a computer readable format. The storage medium 106 may be any of a variety of technological devices configured to store data, including without limitation magnetic disk drives, optical disk drives and random access memory (RAM.) The storage medium 106 may implement methods known in the art for reducing the risk of catastrophic data loss. An example of such a method is Redundant Array of Inexpensive Disks (RAID), a technique wherein data are redundantly written to a plurality of storage media such that the failure of a single storage medium does not cause data loss.

A database server 104 may comprise a processor 108 embedded in hardware, software or a combination thereof. The processor 108 may comprise one or more general purpose microprocessors. The processor may be configured to process queries by searching for data located at the storage medium 106 which matches the queries and returning the matching data. The processor may additionally be configured to perform other tasks to manage the data located at the storage medium. To achieve these goals, the processor may execute computer readable instructions included in RDBMS systems such as those listed above.

A database server 104 may include one or more data stores 110. A data store is a set of data which is stored for future retrieval and which may be queried in order to receive specific requested data. A data store 110 may be stored within a storage medium 106. In an embodiment of the present invention, each data store is implemented as a single database within an RDBMS. Such a database may include one or more tables, each of which may include zero or more tuples. It is noted that a database server 104 may include one or more data stores encrypted according to the present invention concurrently with one or more data stores not encrypted according to the present invention. Furthermore, data encrypted according to the present invention and data not encrypted according to the present invention may be concurrently stored within a single data store.

A database server 104 may be located at a significant distance from other components of the system 102. For example, the database server 104 may be located at the premises of an organization specializing in outsourced database management, while other system components may be located at another organization which outsourced its database to the outsourcing firm. A database server may even be located in a foreign country or other political jurisdiction. Even if the database server is located in the same jurisdiction as the entity whose data is stored thereat, database outsourcing may advantageously allow a single database outsourcing firm to manage the data for a large number of entities. This, in turn, may increase efficiency and reduce costs.

A notable feature of the present invention is that a database server 104 is not trusted. Specifically, it is not assumed that a database server will execute queries correctly or even to the best of its ability. For example, a database server has the ability to tamper with the actual results of a query and to transmit the falsified results to the system which submitted the query. A database server also has the ability to replace the valid contents of the database with invalid data and then execute queries against the invalid data, thus returning incorrect results. In addition to the possibility of malicious actions by the database server, a query may return incorrect data due to an inadvertent technical failure. For example, data may be omitted from query results due to the failure of a storage medium 106 or an interconnection means 116. The present invention introduces countermeasures which may advantageously detect whether query results are incorrect and/or incomplete.

Because the database servers are not trusted, data stored at the one or more database servers 104 are encrypted. This beneficially allows an entity operating the one or more database servers 104 to provide a database outsourcing service without having access to the plaintext form of the data stored at the one or more database servers.

The system 102 also includes one or more clients 112. A client may be any system configured to perform queries against a database server 104 and to receive the results of the queries. The queries may be performed in furtherance of a wide variety of goals. A client 112 may contain means embedded in hardware, software or a combination thereof for performing such queries.

A wide variety of electronic devices may act as clients 112. A client 112 may be a general purpose computer. A computer serving as a client may be a desktop computer based on a general purpose operating system such as Windows® or Linux®. A computer serving as a client may also be a server-class computer based on an operating system such as z/OS® or AIX®.

At the other extreme, a client 112 may be a thin client. A thin client is an electronic device having limited computing functionality compared to typical general purpose computers known in the art. In particular, thin clients typically have limited storage capability. Thin clients may also have less processing power than typical general purpose computers. Examples of thin clients include, without limitation, personal digital assistants (PDA) and mobile phones. A PDA is any of a class of electronic devices which have a small form factor and are highly portable, yet nonetheless possess limited computing functionality. It is noted that many mobile phones known in the art possess limited computing functionality and thus may execute computer code. It is emphasized that embodiments of the present invention are suited to thin clients despite their inherent limitations. For example, embodiments of the present invention do not require the client to execute computationally complex queries locally; a thin client may not have sufficient computing power to execute such queries. Also, embodiments of the present invention do not require the storage of significant amounts of replicated data at a client; a thin client may not have sufficient storage capability to do so.

The system further includes a query interface 114. The query interface may be configured to analyze results returned by a database server 104 to determine whether the results are correct and complete. The query interface may also facilitate interaction between the one or more clients 112 and the one or more database servers 104.

A query interface may be implemented in hardware, software or a combination thereof. A query interface 114 may be a general purpose computer. A computer serving as a query interface may be a desktop computer based on a general purpose operating system such as Windows® or Linux®. A computer serving as a client may also be a server-class computer based on an operating system such as z/OS® or AIX®. A query interface may also be a technological device designed for the specific purpose of implementing the method of the present invention. A query interface may also be a subsystem within another system. For example, a query interface may be a software process executing on a firewall. A firewall is a technological device known in the art for managing access between systems located on an internal network and systems located outside the network in order to improve computer security. A firewall is frequently located in proximity to entry and exit points of a network.

The system 102 may also include an interconnection means 116 to allow communication between the clients 112 and the one or more database servers 104. The interconnection means 116 may span a wide geographic area, including multiple states or even continents. The interconnection means 116 may comprise a network, such as the Internet or a similar TCP/IP-based network. The interconnection means 116 may also comprise a direct connection, such as that obtained from the public switched telephone network (PSTN) or a satellite.

Encryption methods may be directly applied to communications transmitted via the interconnection means 116 in order to provide a secure communications channel. For example, queries may be transmitted and query results may be received via a Secure Sockets Layer (SSL) connection. SSL is a protocol for encrypting transmissions made over a network connection. As another example, a Virtual Private Network (VPN) may also be configured to operate over the interconnection means 116. A VPN is a secure virtual network created by using cryptographic methods known in the art to provide secure communication over an otherwise untrusted network. It is noted that if the data stored at the database server 104 are encrypted, it follows that the encrypted form of the data is transmitted via the interconnection means 116. However, computer code expressing queries and metadata may not be encrypted. Accordingly, applying encryption to all communications transmitted via the interconnection means 116 beneficially prevents eavesdroppers from observing this information. In any case, encrypting the interconnection means 116 may advantageously provide an additional layer of security.

Additionally, authentication methods may be applied to connections made via the interconnection means 116 to ensure that a system's interaction partner is in fact an authorized user. The authentication methods may include applying digital signatures to transmissions. In an embodiment of the present invention, the digital signatures are created using a secret key known to the entity managing the database and the clients 110. In another embodiment of the present invention, a public key infrastructure (PKI) is employed to authenticate systems to each other. A PKI is an arrangement which provides for the confirmation of user identities by a third party. In this arrangement, a private key is used to generate a digital signature, and a corresponding public key is used to verify the digital signature. Generating and verifying digital signatures may comprise cryptographic techniques. It is noted that PKI beneficially separates the ability to verify a digital signature from the ability to create a digital signature.

The system 102 may further include a database owner 118. The database owner is the entity which owns or is otherwise associated with the data stored at the one or more data stores 110. The database owner may be any of a wide variety of entities. Specifically, the database owner may be a business involved in any of a wide variety of industries. Such a business may be organized in any of a variety of forms, including without limitation a corporation, a limited liability corporation (LLC), a partnership or a sole proprietorship. The database owner may also be an organization not having a profit motive. Such organizations may include without limitation educational institutions, research facilities and government agencies. The database owner may be a computer program product, computing system or another technological system implemented in hardware, software or a combination thereof. The database owner may even be an individual human being. Clients 112 may belong to or may otherwise be associated with the database owner. Conversely, clients may belong to an entity other than the database owner or may otherwise be external to the database owner.

The database owner 118 may include a local copy 120 of data stored at the one or more data stores 110. The database owner may further include a local computing system 122 configured to store and/or manage the local copy of data. The local computing system may not be suited for use as a production database configured to process a large volume of queries. In particular, the local computing system may not have sufficient processing power to process the number of queries occurring within the system 102. Furthermore, the local copy of data may not be readily available to the local computing system. For example, data which has been transmitted to the data store 110 may be archived to tape and then deleted from a local storage medium at the local computing system 122. Tape is a computer readable medium suited to archiving large quantities of data at a low cost but having the drawback that data stored thereat are not readily accessible.

Figure 2:
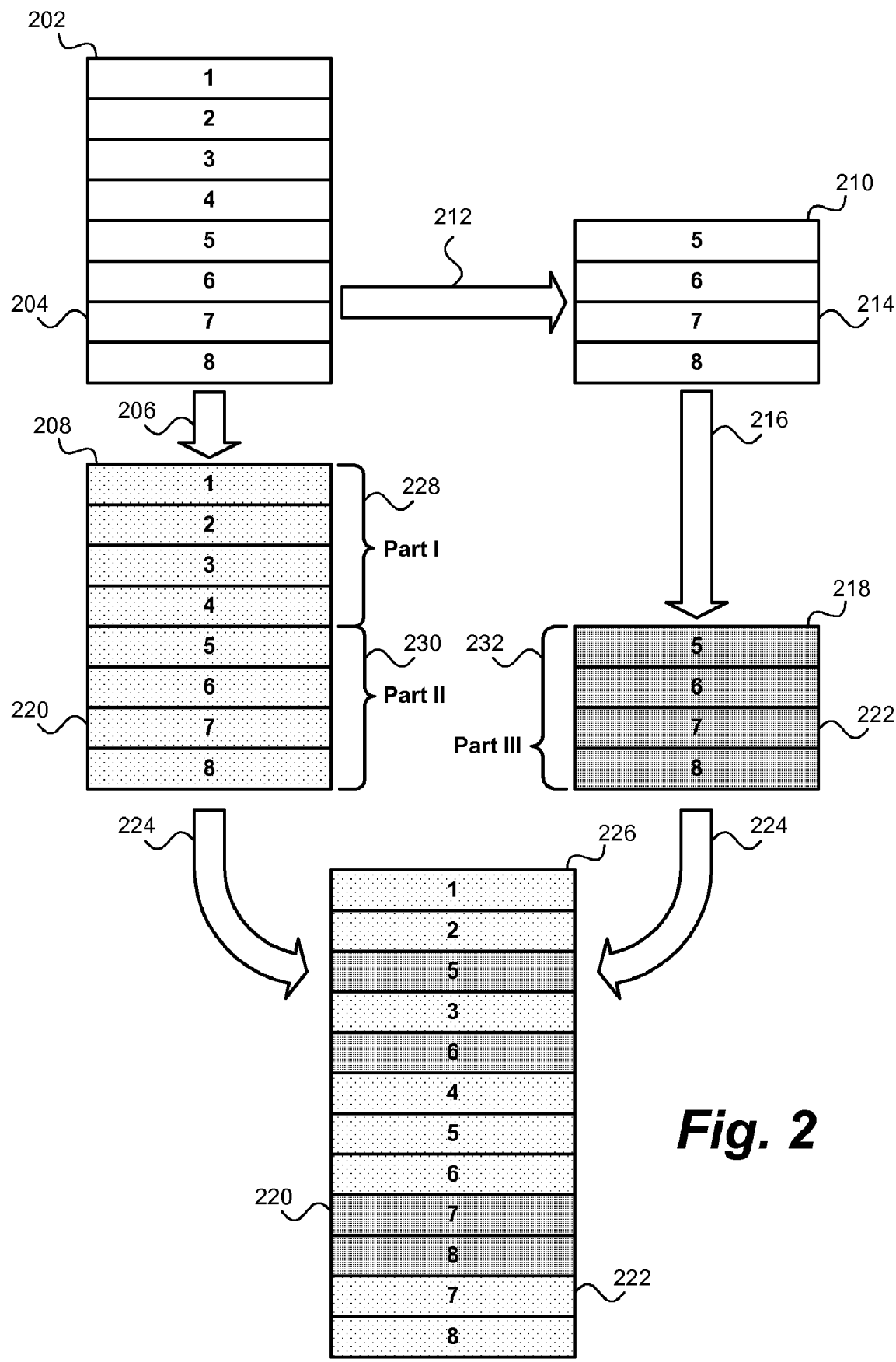
FIG. 2 illustrates an exemplary dual encryption technique used by the method of the present invention.

FIG. 2 illustrates the dual encryption technique used by the method of the present invention.

A plaintext primary data set 202 is available in a local (e.g., non-outsourced) environment. It is contemplated that the plaintext primary data set is in its original, unencrypted form. The exemplary plaintext primary data set 202 is to be stored at a data store located at an outsourced database provider. To ensure privacy, the data is encrypted before being transmitted to the data store. Additional modifications described in detail below are performed upon the data before it is stored in order to facilitate confirming query completeness and data authenticity. In an embodiment of the present invention, the plaintext primary data set 202 is of a relational nature. Specifically, the plaintext primary data set may constitute a single table within a relational data structure.

The exemplary plaintext primary data set 202 is a relational table containing eight tuples 204. Each exemplary tuple is assigned a unique identifier between 1 and 8 inclusive. It is noted that data need not have primary keys or other unique identifiers in order to be processed using the methods of the present invention. It is emphasized that FIG. 2 depicts a comparatively low number of tuples to facilitate a visual understanding of how each tuple is transformed by the method of dual encryption. This does not imply that dual encryption may only be applied to comparatively small data sets. To the contrary, dual encryption may be applied to data sets containing very large quantities of data.

The plaintext primary data set 202 is encrypted using a first encryption 206. The result of this operation is an encrypted primary data set 208. The first encryption may comprise any of a wide variety of encryption techniques known in the art. It is contemplated that the first encryption transforms the plaintext data so that it is computationally infeasible for the outsourced database provider to determine the plaintext data based on the encrypted data. Furthermore, any unique identifiers are encrypted by the first encryption 206 along with the rest of the data. It is therefore noted that although the unique identifiers are visible in the figure, it is computationally infeasible to determine the identifiers without the ability to reverse the first encryption.

A plaintext secondary data set 210 is then determined by selecting 212 a subset of the plaintext primary data set 202. The plaintext secondary data set may be selected so as to contain a predetermined proportion of the plaintext primary data set. The predetermined proportion is known as the replication factor. It is noted that although FIG. 2 depicts a replication factor of 0.5, this factor was selected specifically to enhance the visual understanding of dual encryption afforded by the figure. It is contemplated that a replication factor of 0.1 (e.g., 10%) may suffice to fulfill the goals of the present invention under most environments. In an embodiment of the present invention, the primary and secondary data sets are both tables within a relational data structure, and selecting 212 comprises choosing tuples from the plaintext primary data set 202 to be included in the plaintext secondary data set 210.

It is emphasized that data at the plaintext secondary data set 210 contains the same values as corresponding data in the plaintext primary data set 202. For example, tuple 7 214 in the plaintext secondary data set contains the same values as tuple 7 204 in the plaintext primary data set.

The plaintext secondary data set 210 is encrypted using a second encryption 216. The result of this operation is an encrypted secondary data set 218. The second encryption may comprise any of a wide variety of encryption techniques known in the art. The second encryption may comprise the same algorithm as the first encryption but may use a different secret key than the first encryption. It is contemplated that as with the first encryption, the second encryption transforms the plaintext data so that it is computationally infeasible for the outsourced database provider to determine the plaintext data based on the encrypted data. As with the first encryption, any unique identifiers in the exemplary plaintext secondary data set 210 are encrypted by the second encryption 216 along with the rest of the data. It is therefore noted that although the unique identifiers are visible in the figure, it is computationally infeasible to determine the identifiers without decrypting the data.

As previously mentioned, tuple 7 204 in the plaintext primary data set contains identical values to tuple 7 214 in the plaintext secondary data set. Tuple 7 220 in the encrypted primary data set is an encrypted form of tuple 7 204 in the plaintext primary data set. Tuple 7 222 in the encrypted secondary data set is an encrypted form of tuple 7 214 in the plaintext secondary data set. It directly follows that tuple 7 222 in the encrypted secondary data set is another encrypted form of tuple 7 204 in the plaintext primary data set. In other words, tuple 7 220 in the encrypted primary data set and tuple 7 222 in the encrypted secondary data set are different encryptions of the same data. When two encrypted quantities of data are different encryptions of the same plaintext quantity of data, there is said to be data correspondence between the two encrypted quantities of data. Data correspondence can be defined more rigorously by using mathematical terminology:

Let T be a data set.
Let $T_A$ be an encryption of T.
Let $T_B$ be another encryption of T.
Let $D_A \subseteq T_A$
Let $D_B \subseteq T_B$.

$D_A$ corresponds to $D_B$ if both are encryptions of the same subset of data in T.

The encrypted primary data set 208 and the encrypted secondary data set 218 are then stored 224 at a data store 226. The encrypted primary data set and the encrypted secondary data set may be stored in a single definable subset of the data store. In an embodiment of the present invention, both encrypted data sets may be stored within the same table of a relational database.

Because all data stored at the data store are encrypted, it is contemplated that it is computationally infeasible for the outsourced database provider to discover the contents of the plaintext primary data set 202.

Furthermore, because the data are encrypted, it is contemplated that it is computationally infeasible for the outsourced database provider to determine whether a particular datum is part of the primary data set or the secondary data set. It is contemplated that the outsourced database provider is not provided information about which data belong to the primary data set and which belong to the secondary data set. It follows that where data correspondence exists between two quantities of data stored at the data store, the outsourced database provider is unaware of this fact. For example, the outsourced database provider is not aware that data correspondence exists between tuple 7 220 from the encrypted primary data set and tuple 7 222 from the encrypted secondary data set.

The data stored at the data store 226 may be classified into three parts. Part I 228 includes all data in the encrypted primary data store which does not correspond to any data located at the encrypted secondary data store. It is noted that Part I includes encrypted data if and only if its plaintext version is included in the plaintext primary data store but is not included in the plaintext secondary data store. Part II 230 includes all data in the encrypted primary data store which corresponds to data in the encrypted secondary data store. It is noted that Part II includes encrypted data if and only if its plaintext version is included in both the plaintext primary data store and the plaintext secondary data store. Part III 232 is identical to the encrypted secondary data store 218.

It is noted that the size of the dually encrypted data stored at the data store 226 is $(1+r)N_T$, where r is the replication factor and $N_T$ is the size in bytes of one tuple. It is further noted that the overhead resulting from the dual encryption operation is $rN_T$.

Turning now to FIG. 3, additional detail is provided about an exemplary system for database outsourcing as contemplated by the present invention.

The system 102 includes one or more data stores 110. A data store may be located at a database server 104. As previously noted, the data store may be located at a significant physical distance from other components of the system 102. The data store may be managed by an entity other than the entity to which the data stored thereat belongs. Specifically, the data store may be located at premises controlled by a database outsourcing firm and may be managed by the database outsourcing firm. The data store may be configured to store data in a manner which minimizes storage overhead. The data store may also be configured to execute queries in a manner which minimizes the overhead required to process queries.

Data from a wide variety of sources may be stored at the data store 110. A client 112, a query interface 114 or another system acting on behalf of a database owner may submit data to be stored at the database. Furthermore, data may be transmitted to the data store 110 using a wide variety of data transmission methods known in the art. Exemplary methods suitable for transmitting data in accordance with the present invention are discussed below.

A data store 110 may be configured to store data according to any of a variety of database paradigms known in the art, including without limitation a relational paradigm, a hierarchical paradigm, an object-oriented paradigm or a composite of a plurality of database paradigms. It is emphasized that while FIG. 3 demonstrates an exemplary system based on a relational data store, this in no way implies that the present invention is limited to data managed according to a relational paradigm.

A data store 110 stores data encrypted according to the dual encryption method shown in FIG. 2. Specifically, the data store is configured to store a data set encrypted using a first encryption and a data subset encrypted using a second encryption. To achieve this result, a data set is encrypted using a first encryption. The exemplary first encryption outlined in the description of FIG. 4A may be applied to the data set to achieve this goal. A subset of the data set is then encrypted using a second encryption. The exemplary second encryption outlined in the description of FIG. 4A may be applied to the data set to achieve this goal. The data output by the first encryption and the second encryption are both stored at the data store.

In the exemplary data store of FIG. 3, some data stored at the data store 110 and encrypted using the first encryption correspond to other data stored at the data store and encrypted using the second encryption. For example, a tuple with a unique identifier of 7, encrypted using the first encryption 220, is stored at the data store 110. The same tuple 7, encrypted using the second encryption 222, is also stored at the data store. The data store also includes tuples, such as tuple 5 302, which are encrypted using the first encryption and which do not correspond to any tuple encrypted using the second encryption.

As mentioned above, the first encryption and the second encryption may comprise any of a wide variety of encryption techniques known in the art. The first encryption and the second encryption may comprise the same encryption algorithm but may differ in the specific secret keys input to the encryption algorithm. It is contemplated that the first encryption and the second encryption transform plaintext data so that it is computationally infeasible to discover the plaintext data from the encrypted data without knowing the encryption key used to encrypt the data. Because the data store 110 does not have the secret key, it is computationally infeasible for the data store to discover the plaintext data. For this reason, it is contemplated that the data store 110 also cannot determine whether a unit of data is encrypted using the first encryption or using the second encryption.

The first encryption and the second encryption may be order preserving. An encryption method is order preserving if for any two plaintext data a and b, where a<b, the encrypted form of a will also be less than the encrypted form of b. Order preserving encryption beneficially allows a data store to efficiently evaluate queries matching plaintext values within a specific range even though it does not have access to the plaintext values. This is possible because a query including at least one inequality condition may be modified by encrypting each constant value serving as the end point of an inequality condition. The query thus modified will match all data whose plaintext data matches the plaintext inequality conditions. In an embodiment of the present invention, the first encryption and the second encryption are only order preserving when applied to numeric data. In another embodiment of the present invention, the first encryption and the second encryption are order preserving for a variety of data types, including numeric data, textual data and raw binary data.

The data store 110 may index the data stored therein. Indexing is a technique known in the art for decreasing the time required to respond to queries by precomputing the locations at which data for which a specific field has a specific value may be found. In particular, indexing depends on the ability to determine a logical ordering of the values in an indexed field. Order preserving encryption may allow the data store 110 to efficiently index the encrypted data despite not knowing its plaintext values. Specifically, the data store may index data based on its encrypted values, and the index will cause the data to be sorted based on its plaintext values. More generally, the first encryption and second encryption may support various indexing techniques that enable efficient query processing.

Information about the schema of data located at the data store 110 may also be encrypted. Schema information is metadata related to the structure of a database, such as table names, column names and column statistics. Encrypting schema information beneficially reduces the risk that the data store 110 may recover plaintext data by analyzing the distribution of the data stored thereat.

In an embodiment of the present invention, a data store 110 may concurrently store a plurality of data sets encrypted using dual encryption. In another embodiment of the present invention, a data store may store data sets not encrypted using a method of the present invention concurrently with data sets encrypted using dual encryption.

A data store 110 may be segmented into one or more definable subsets 304, 306. In the exemplary system shown in FIG. 3, the definable subsets are tables 304, 306 within a relational database structure. Furthermore, the result of applying dual encryption to a plaintext data set may be stored in a single definable subset 304 of the data store. Specifically, a data set encrypted using a first encryption and a data subset encrypted using a second encryption may be stored in a single definable subset of the data store. For example, a relational data set may comprise a plurality of plaintext tuples. Each plaintext tuple may be encrypted using the first encryption, with the results of the first encryption stored at a table 304 at the data store. A subset of the plaintext tuples may then be encrypted using the second encryption, with the results of the second encryption stored at the same table 304 as the results of the first encryption. Storing the data set encrypted using the first encryption and the data subset encrypted using the second encryption in the same definable subset of a data store prevents the data store from determining which encryption was applied to a unit of data based on the subset of the data store at which the unit of data is located. As previously mentioned, it is contemplated that the data store cannot determine which encryption was applied to a unit of data by analyzing the data itself. Therefore, it is contemplated that the data store has no ability to determine which encryption was applied to a unit of data.

A third encryption may be applied to a definable unit of data to generate a confirmation value 308. The confirmation value may facilitate determining whether the definable unit of data is valid. The confirmation value may also signify whether the definable unit of data was encrypted using the first encryption or the second encryption. The confirmation value may further signify whether plaintext data from which the definable unit of data was generated, encrypted using the second encryption if the definable unit of data is encrypted using the first encryption and encrypted using the first encryption if the definable unit of data is encrypted using the second encryption, is also stored at the data store. In other words, the confirmation value may signify whether the unit of data is in Part I, Part II or Part III of the taxonomy shown in FIG. 2. In an embodiment of the present invention, a separate confirmation value is determined for each tuple of a set of relational data.

A definable unit of data may be any identifiable, discrete subset of a data set. Where a data set is structured according to a relational paradigm, a definable unit of data within that data set may be a tuple. It is emphasized, however, than a variety of subsets of data structured according to a variety of database paradigms may be definable units of data as contemplated by the present invention.

A data store 110 may be configured to store a confirmation value 308 in conjunction with a definable unit of data. In the exemplary system of FIG. 3, an additional column is added to a table 304, 306 located at the data store 110 in order to store the confirmation value 308. It is noted that each tuple in the table may have a separate value in this column. This column may be named "dual". The confirmation value for each tuple is stored within the "dual" column for that tuple.

The confirmation value may contain 128 bits of data. The confirmation value may be stored as binary data. The confirmation value may also be stored as a textual representation of binary data. For example, binary data representing a confirmation value may be expressed as a number in base 10 or base 16, with the numeric expression stored as text in the database. The binary string may also be input to any of a set of algorithms known in the art for converting binary data to textual data while minimizing the increase in the size of the data. An example of such an algorithm is Base64, which transforms arbitrary binary data so that each segment of 24 bits of data is expressed as four characters. The output of such a function may be stored as the confirmation value.

To determine the confirmation value for a definable unit of data, a third encryption is applied to the definable unit of data. The third encryption may comprise one way hashing. The exemplary third encryption outlined below may be employed to generate a confirmation value.

In an embodiment of the present invention, a secret key is shared among systems which transmit queries to the data store 110. Such systems may include the query interface 114, clients 112 and other systems associated with a database owner. A confirmation value 308 for a definable unit of data is computed by inputting the definable unit of data and the secret key to a one-way hash function. The result of the one-way hash function may be a binary string 128 bits in length.

In an embodiment of the present invention, the length of the confirmation value is the number of bits in the output of the one way hash function. For example, if a one way hash function is configured to return a value 128 bits in length, the confirmation value will also be 128 bits in length.

Mathematical modifications may be applied to a confirmation value 308 to provide meta-information about the definable unit of data. Meta-information may include a specification of whether the definable unit of data was encrypted using the first encryption or the second encryption. Meta-information may also include a specification of whether plaintext data from which the definable unit of data was generated, encrypted using the second encryption if the definable unit of data is encrypted using the first encryption and encrypted using the first encryption if the definable unit of data is encrypted using the second encryption, is also stored. In other words, meta-information may include whether the definable unit of data corresponds to another definable unit of data stored at the data store encrypted using the other encryption. It is noted that the resulting confirmation value may signify whether the unit of data is in Part I, Part II or Part III of the taxonomy shown in FIG. 2. Mathematical modification may be effected by employing an exemplary algorithm outlined below.

Mathematical modifications which may be applied to the result of a third encryption may result in values not in the range of the third encryption. For example, a mathematical modification which adds a value between 0 and 2 to the 128-bit result of a third encryption may itself result in a value which requires at least 129 bits to be expressed without arithmetic overflow. Therefore, in an embodiment of the present invention, the length of the confirmation value is selected so that any value resulting from a mathematical modification can be stored in the confirmation value without modification.

A data store 110 may also be configured to execute queries. To execute a query, the data store may select a subset of the data stored thereat which matches the matching criteria of the query. The data store may then transmit the selected data to the system which issued the query. As previously noted, it is contemplated that the data store cannot distinguish between data encrypted using the first encryption and data encrypted using the second encryption. Therefore, it is contemplated that a data store executes each received query against both data encrypted using the first encryption and data encrypted using the second encryption. This is the case even if the query is configured to match data encrypted using the first encryption or if the query is configured to match data encrypted using the second encryption. While such a query may generally match only data encrypted using the first encryption or the second encryption respectively, it is contemplated that the data store has no knowledge of this fact.

The system 102 further includes one or more clients 112. As previously discussed, a wide variety of technological devices may serve as clients. Each client 112 is configured to perform at least one substantive query 310 against a data store 110 to retrieve a primary data result encrypted using the first encryption. Each client 112 may also be configured to receive 312 results of substantive queries performed by the client from a data store 110.

A client 112 may be unaware that data stored at a data store 110 are dually encrypted. In this case, the client may not be configured to interact with a data store according to the method of the present invention. This implies that the client 112 may perform a substantive query against the data store which is not configured to match data encrypted using the first encryption. Accordingly, substantive queries may initially be transmitted to the query interface 114, which may process the substantive query and may transmit the processed substantive query 314 to the data store 110. In response, the data store may initially transmit a result 316 of the processed substantive query to the query interface, which may process the result and may transmit the processed result 312 to the client 112. Transmission of queries and their results between the query interface 114 and the data store 110 may be performed via an interconnection means 116.

Alternatively, a client 112 may be aware that data stored at the data store are dually encrypted. In this case, the client may directly query a data store 110 without intervention by the query interface 114. In order to match data encrypted using the first encryption, any parameters included in a substantive query must be encrypted. Accordingly, the client may be configured to generate substantive queries wherein each parameter is encrypted using the first encryption. The client may also be configured to decrypt results of substantive queries using the first encryption to obtain plaintext data. It is contemplated that in this case, information is provided to the query interface about the transmitted substantive queries and the results of the substantive queries to assist it in validating the results of the queries. This may be achieved by direct communication between the client 112 and the query interface 114. It may also be achieved by the query interface intercepting the substantive queries and their results from an interconnection means 116. For example, a proxy server or a firewall may be configured to transmit queries and their results to the query interface. Proxy servers and firewalls are systems configured to interpolate themselves within a message flow between two systems and to manage, modify or restrict the message flow.

The system 102 further includes a query interface 114. The query interface is configured to determine whether the results returned in response to at least one substantive query are correct and complete. Specifically, the query interface 114 may determine whether data received in response to the at least one substantive query is equivalent to data previously stored at the data store by a database owner. The query interface 114 may also determine whether data received in response to the at least one substantive query does not include all data previously stored at the data store by a database owner, and not subsequently removed or modified by the database owner, which matches the at least one substantive query. The query interface may also facilitate interaction between clients 112 and data stores 110. In particular, the query interface may modify substantive queries 310 transmitted by a client so that the modified queries match data encrypted using methods of the present invention. The query interface may also decrypt results 316 received from a data store in response to substantive queries.

As previously noted, a client 112 may be unaware that data stored at the data store are dually encrypted. Such a client 112 may perform substantive queries 310 wherein one or more parameters are expressed in plaintext. The query interface 114 may be configured to modify a substantive query so that one or more parameters included in the query are encrypted using the first encryption. Specifically, the query interface may, for each plaintext parameter included in a substantive query, encrypt the parameter using the first encryption and replace the plaintext parameter with its encrypted form. To achieve this goal, the query interface may perform the exemplary operations outlined in the description of FIG. 4B for this purpose. The query interface may then transmit the modified substantive query 314 to the data store 110.

The query interface 114 may intercept plaintext substantive queries submitted by clients 112 and intended for a data store 110 so that the plaintext substantive queries may be modified as described above. Intercepting may be achieved by configuring one or more clients 112 to transmit substantive queries 310 to the query interface instead of transmitting the queries directly to a data store 110. Intercepting may also be achieved by the query interface directly intercepting the transmitted substantive query from a network.

The query interface may receive a result 316 in response to a modified substantive query 314. The query interface may decrypt the received result 316 using the first encryption. In some cases, a modified substantive query (correctly) configured to return a result encrypted using the first encryption will nonetheless return one or more definable units of data encrypted using the second encryption. As any data encrypted using the second encryption are extraneous, the query manager may remove any data encrypted using the second encryption from the result. The query manager may then retransmit 312 the plaintext result resulting from the decrypting operation to the client 112.

In an embodiment of the present invention, the query interface 114 is configured to modify identity queries configured to retrieve a result which is a subset of a single definable subset 304, 306 of a data store 110. If the data store is relational, the identity queries may be configured to retrieve a subset of the tuples 220, 222, 302 stored in a single table 304, 306 of the data store. The queries may be coded in Structured Query Language (SQL.) The query interface 114 may perform the operations of the exemplary algorithm outlined in the description of FIG. 4B for modifying queries to match data encrypted using the first encryption.

It is noted that as a result of the actions performed by the query manager 114, database outsourcing as contemplated by the present invention may be transparent to the client. This may beneficially allow existing systems not designed for database outsourcing as contemplated by the present invention to interact with a data store implementing the method of the present invention.

As previously noted, a data store 110 may be configured to store a confirmation value 308 in conjunction with a definable unit of data 220, 222, 302. Accordingly, data received 316 at the query interface 114 in response to a substantive query 314 may include these confirmation values. Specifically, for a definable unit of data 220, 222, 302 returned by a substantive query, a confirmation value stored at the data store in conjunction with the definable unit of data may be included in the query results. If the data store 110 is structured according to a relational paradigm, each tuple received in response to a substantive query may include a confirmation value relating to the remainder of the tuple. The query interface may be configured to analyze a definable unit of data returned in response to a query and its corresponding confirmation value. The analysis may be performed to determine whether the definable unit of data is equivalent to data previously stored at the data store by a database owner. To perform the analysis, the query interface may perform the exemplary operations outlined in the description of FIG. 4B for this purpose.

If the definable unit of data is determined not to be equivalent to previously stored data, the query interface may take action in response to this condition. The query interface may provide a data invalid notification to the client 112 and/or to another system. The query interface may remove the false data from the results before they are transmitted to the client. The query interface may repeat the modified substantive query 314 one or more times in case the data transmitted 316 were corrupted during transmission. The query interface may even cease interacting with the data store 110 entirely.

Analyzing a returned confirmation value 308 comprises determining meta-information about the definable unit of data 220, 222, 302 corresponding to the confirmation value. Specifically, the query interface 114 may determine, based on the confirmation value, whether the definable unit of data was encrypted using the first encryption or the second encryption. The query interface may further determine whether plaintext data from which the definable unit of data was generated, encrypted using the second encryption if the definable unit of data is encrypted using the first encryption and encrypted using the first encryption if the definable unit of data is encrypted using the second encryption, is also stored at the data store. If a definable unit of data returned in response to a substantive query is thus determined to be encrypted using the second encryption, the query interface 114 may delete the definable unit of data from the query result.

The query interface 114 may also determine whether the results returned in response to substantive queries 314 are correct and complete. To achieve this goal, the query interface is configured to perform at least one validating query 318 against the data store to retrieve a secondary data result encrypted using the second encryption. The query interface is further configured to analyze data at least one primary data result 316 and at least one secondary data result 320. The analysis may be performed to determine the correctness and completeness of the results returned in responses to the at least one substantive query. The query interface is configured to provide a data invalid notification if any definable unit of data included in a decrypted secondary data result, the definable unit of data satisfying one or more of the at least one substantive queries, is not contained in any primary data result. Such a data invalid notification may be provided to the client 112 and/or to another system. The query interface may also take additional steps in response to such a condition. For example, the query interface may repeat the at least one substantive query 314 validated by the at least one validating query 318 one or more times in case the data transmitted 316 were corrupted during transmission. The query interface may even cease interacting with the data store 110 entirely.

The query interface 114 may perform one validating query 318 for each substantive query 314 issued in order to validate that substantive query. This approach doubles the number of queries submitted to the data store 110. The query interface may also perform a single validating query to validate a plurality of substantive queries. This approach can reduce the overhead required to ensure the correctness and completeness of the data.

As previously noted, for a subset of the data encrypted using the first encryption and stored at a data store 110, the corresponding data encrypted using the second encryption was also stored at the data store. In terms of the taxonomy of FIG. 2, for any data in Part II located at the data store, the corresponding data in Part III was also stored at the data store. Thus, suppose that data encrypted using the first encryption 220, 302 are returned in response to a substantive query 314. Any data encrypted using the second encryption 222 and corresponding to data returned in response to the substantive query should also be returned in response to a query whose predicate matches data having the same plaintext values as the substantive query but which is configured to retrieve data encrypted using the second encryption. If all corresponding data are not returned, it can be concluded that the results returned by the data store are not correct and/or not complete.

To capitalize on this strategy, the query interface 114 may be configured to generate at least one validating query 318 in order to retrieve encrypted data generated from the same plaintext data as encrypted data received in response to at least one substantive query 314. Specifically, the at least one validating query may be configured to retrieve data encrypted using the second encryption 222 which corresponds to data 220, 302 returned in response to at least one substantive query.

In the case where a validating query 318 validates a single substantive query 314, the query interface 114 may initially generate a validating query having matching criteria equivalent to the plaintext matching criteria of the substantive query. The query interface may then modify the generated query so that one or more parameters included in the query are encrypted using the second encryption. Specifically, the query interface may, for each plaintext parameter within the generated query, encrypt the parameter using the second encryption and replace the plaintext parameter with its encrypted form. To achieve this goal, the query interface may perform the exemplary operations outlined in the description of FIG. 4 for this purpose. The result of this sequence of operations may be issued as a validating query 318.

In the case where a validating query 318 may validate either a single substantive query 314 or a plurality of substantive queries, the query interface 114 may generate the validating query based on a combination of the matching criteria of one or more of the substantive queries. In terms of the branch of mathematics known in the art as set theory, the matching criteria of the validating query may comprise a union of the plaintext matching criteria of one or more of the substantive queries. Specifically, the validating query may be configured to match any data encrypted using the second encryption 222 which corresponds to data encrypted using the first encryption 220, 302 which is matched by at least one of the one or more substantive queries being validated. As in the previous case, the query interface may then modify the generated query so that one or more parameters included in the query are encrypted using the second encryption. The result may be submitted as a validating query.

Figure 5:
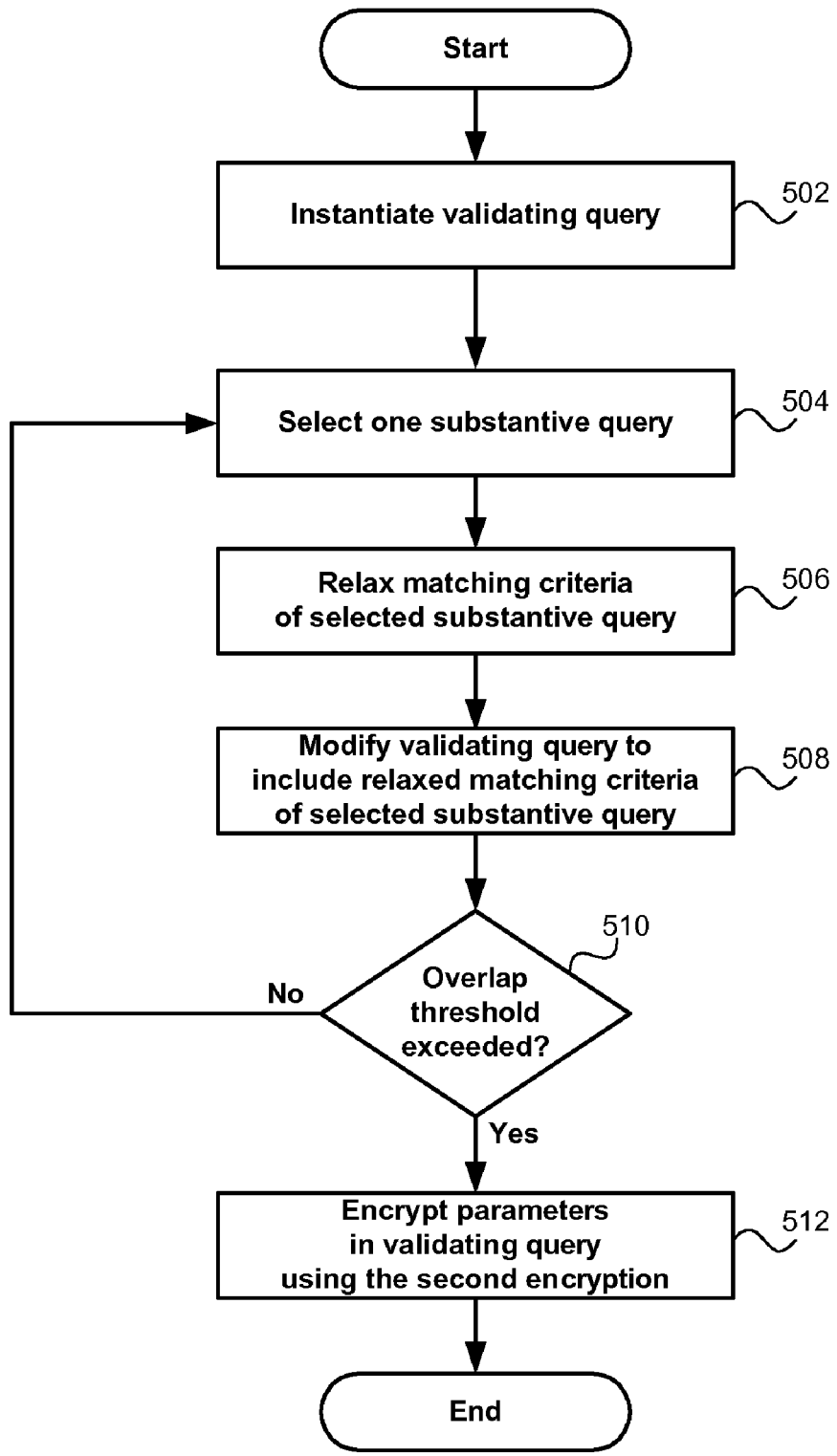
FIG. 5 shows an exemplary sequence of operations for generating a validating query.

In an embodiment of the present invention, the query interface generates the at least one validating query 318 by performing the exemplary operations outlined in the description of FIG. 5.

The query interface 114 may apply an additional precaution in generating validating queries 318. Specifically, the validating query may be modified to impose syntactical differences between it and the one or more substantive queries 314 which it was generated to validate. As a result, the matching criteria in at least one validating query 318 may be a superset of the matching criteria in at least one substantive query 314. The query interface may perform the steps outlined in relaxing operation 506 of FIG. 5 to achieve these modifications.

Figure 4A:
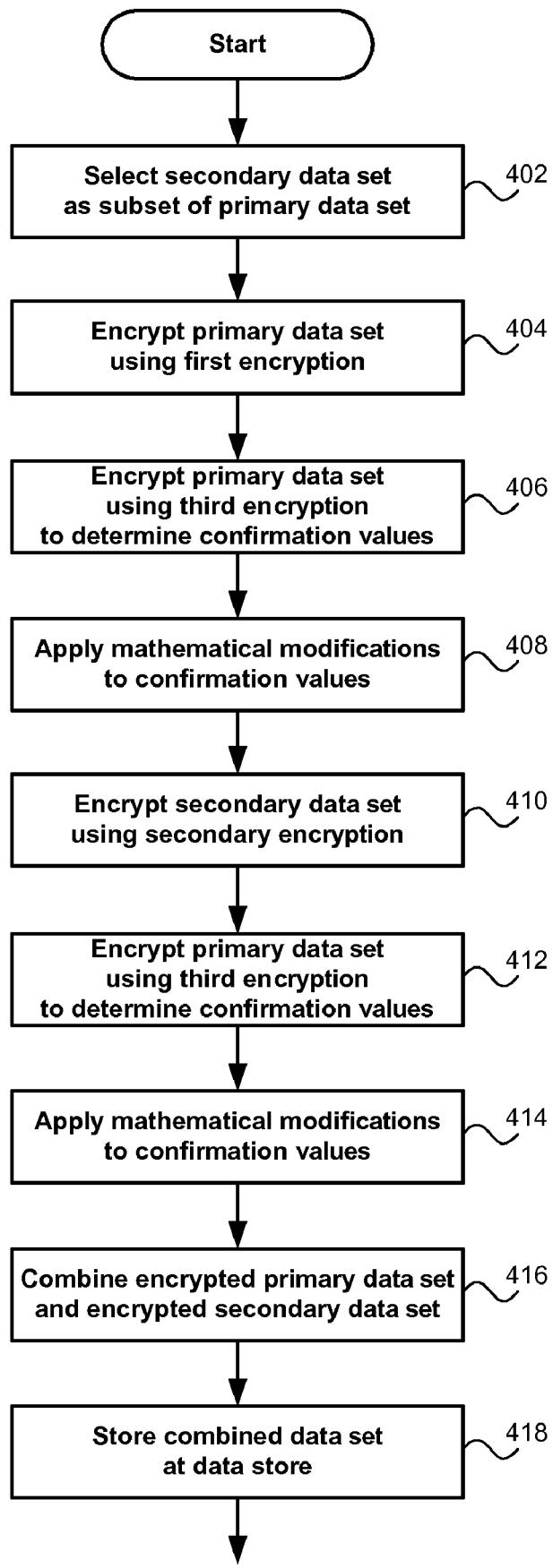
FIGS. 4A and 4B illustrate an exemplary flowchart of operations for confirming the validity of data returned from a data store.
Figure 4B:
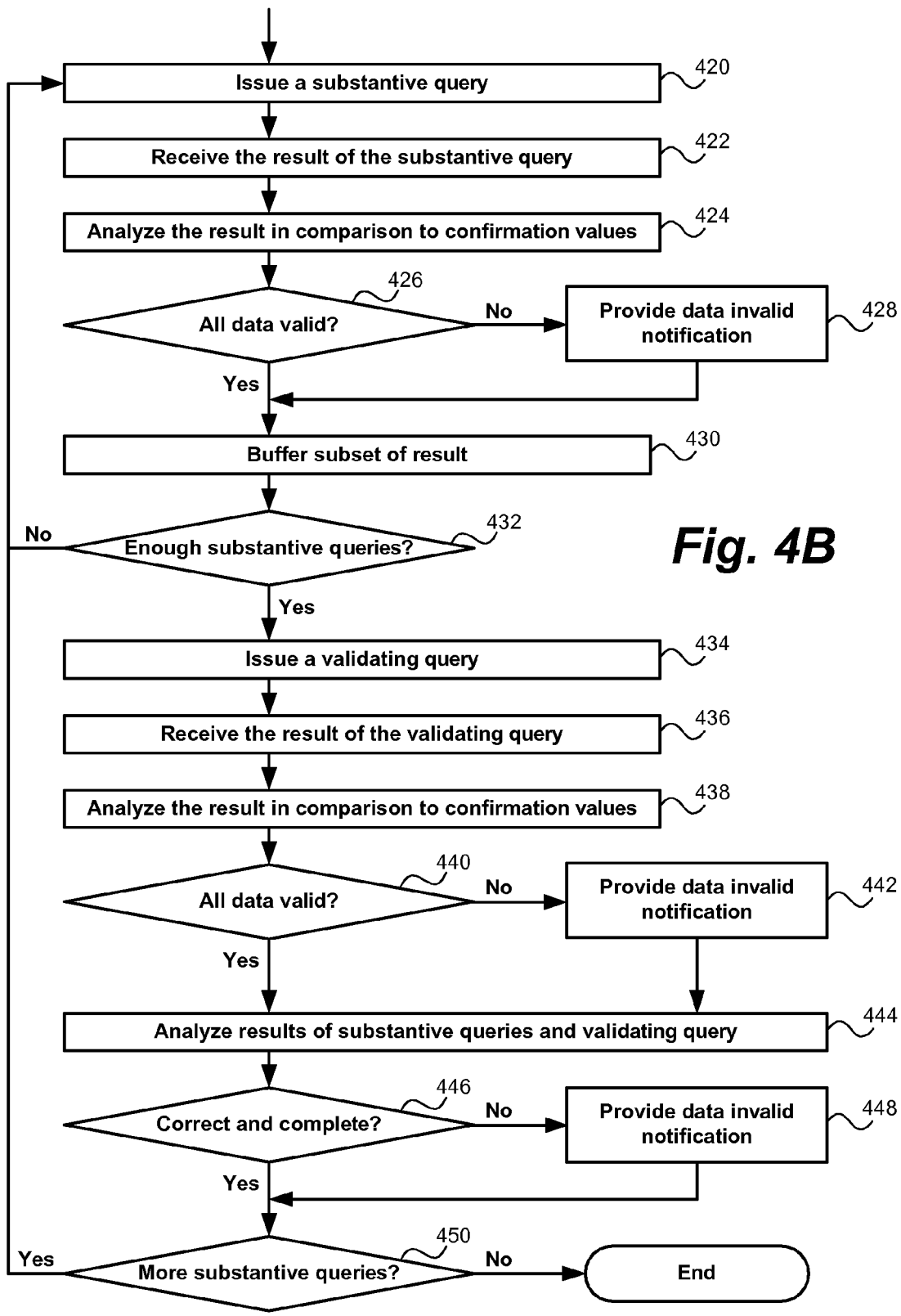

Turning now to FIGS. 4A and 4B, an exemplary flowchart of operations for confirming the validity of data returned from a data store is shown.

At the start of the flowchart of operations demonstrated herein, a primary data set exists. The primary data set may contain any of a wide variety of types of data. The primary data set may be structured in any of a wide variety of ways and according to any of a wide variety of database paradigms. The primary data set may comprise plaintext data. In an embodiment of the present invention, the primary data set is of a relational nature. Specifically, the primary data set may constitute a single table within a relational data structure.

The set of operations shown in FIG. 4A (e.g., those beginning with selecting operation 402 and ending with storing operation 418) may be implemented and/or envisioned as a function called "dataTransform( )". This set of operations receives as input the primary data set. The operations transform the primary data set according to the method of dual encryption. The result of the set of operations is the storage of the transformed data at a data store. The data store may be managed by an outsourced database provider.

The operations shown in FIG. 4A may be performed by computing systems within a local environment managed by a database owner. The database owner may be any of a wide variety of entities to which the primary data set belongs. Specifically, the operations may be performed by a query interface. The query interface may perform the operations in response to a request from a client to store a primary data set at a data store. Also, a client may itself perform the operations. Furthermore, the operations may also be performed by another local computing system managed by a database owner. For example, the operations may be performed by a database server managed by a database owner.

It is noted that more than one system may transmit data to a data store. For example, the operations shown here may initially be performed by a local database server in order to replicate a primary data set located thereat to a data store. Clients may subsequently transmit additional primary data sets to a query interface. The query interface may then, for each additional primary data set, perform the steps beginning with selecting operation 402 and ending with storing operation 418 so that the additional primary data set is also stored at the data store according to the method of dual encryption. It is noted that in this case, the original primary set and the additional primary data sets may be concurrently located at the data store.

Beginning with FIG. 4A, at selecting operation 402, a subset of the primary data set is selected. The selected subset is stored as a secondary data set. In an embodiment of the present invention, the primary and secondary data sets are both tables within a relational data structure, and selecting operation 402 comprises selecting tuples from the primary data set to be included in the secondary data set.

The secondary data set may be selected so as to contain a predetermined proportion of the primary data set. Specifically, the secondary data set may be selected so that the ratio of the quantity of data contained therein to the quantity of data in the primary data set equals or approximates a specific value. In the case of a relational data set, the secondary data set may be selected so that the ratio of the number of tuples in the secondary data set to the number of tuples in the primary data set equals or approximates the specific value. This ratio is known as the replication factor. It is contemplated that a replication factor of 0.1 (e.g., 10%) suffices under most environments.

A wide variety of algorithms may be employed to determine the subset of the primary data set which is selected for inclusion in the secondary data set. The subset may be selected randomly. Specifically, a definable unit of data in the primary data set may have a probability of being selected which is equal to the replication factor. The subset may also be selected so that every definable unit of data whose position in the primary data set is divisible by the multiplicative inverse of the replication factor is selected and so that other definable units of data are not selected. For example, if the replication factor is 0.1, every definable unit of data whose position in the primary data set is divisible by ten may be selected. The subset may also be selected based on the value of a unique identifier. Specifically, definable units of data having a unique identifier divisible by the multiplicative inverse of the replication factor may be selected. Definable units of data not meeting this criterion may not be selected. For example, if the replication factor is 0.2, the subset may include only definable units of data whose confirmation values are evenly divisible by five.

It is emphasized that the actual ratio of the quantity of data in the secondary data set to the quantity of data in the primary data set may not exactly equal the replication factor. In fact, a slight difference between the actual ratio and the replication factor is unavoidable if the quantity of data in the primary data set multiplied by the replication factor is not an integer. Furthermore, the selecting algorithm may in fact select a proportion of the primary data set which is larger or smaller than the replication factor. For example, if only those definable units of data having a unique identifier evenly divisible by five are selected, the proportion of data selected may not exactly equal 0.2 if it is not the case that any positive integer has an equal probability of having been stored as a unique identifier.

It is contemplated that any such deviations from the replication factor are comparatively small and do not significantly hinder the method of the present invention.

At encrypting operation 404, the primary data set is encrypted using a first encryption. The result of this operation is an encrypted primary data set. The first encryption may comprise any of a wide variety of encryption techniques known in the art. It is contemplated that the first encryption transforms the primary data set so that it is computationally infeasible for a data store to determine the plaintext data based on its encrypted form. In an embodiment of the present invention, the first encryption is order preserving.

The first encryption may comprise inputting plaintext data and a secret key to an encryption function. The encryption function may be configured to return a binary string as a result. The binary string may be stored in binary form. The binary string may also be converted to a textual representation of the data contained therein. For example, the binary string may be expressed as a number in base 10 or base 16. The binary string may also be input to any of a set of algorithms known in the art for converting binary data to textual data while minimizing the increase in the size of the data. An example of such an algorithm is Base64, which transforms arbitrary binary data so that each segment of 24 bits of data is expressed as four characters. The encryption function may also be configured to return textual data or numeric data.

The first encryption may be applied to all data in the primary data set. Specifically, the primary data set may be subdivided into a plurality of definable units of data, wherein the definable units of data are disjoint. Each definable unit of data may then be encrypted using the first encryption. The first encryption may be performed in a manner such that the field to which a specific segment of encrypted data belongs may be determined without decrypting the data. This may advantageously facilitate executing queries against data encrypted using the first encryption and indexing stored data encrypted using the first encryption. For each tuple in the primary data set, the same secret key may be input to an encryption function implementing the first encryption. In an embodiment of the present invention, the primary data set is structured according to a relational paradigm, and each tuple within the primary data set is separately encrypted using the first encryption.

The first encryption may be applied to any unique identifiers present in the primary data set. It is noted that data need not have primary keys or other unique identifiers in order to be processed using the method of the present invention. Encrypting unique identifiers is beneficial because the identifiers themselves may comprise sensitive data. Furthermore, if unique identifiers are not encrypted, the data store may be able to analyze the unique identifiers to determine data correspondence.

At encrypting operation 406, one or more definable units of data included in the encrypted primary data set may be encrypted using a third encryption to determine a confirmation value. The confirmation value may facilitate determining whether the definable unit of data is equivalent to data previously stored at the data store by a database owner. In an embodiment of the present invention, the encrypted primary data set is structured according to a relational paradigm, and a separate confirmation value is determined for each tuple of the encrypted primary data set.

The third encryption may comprise one way hashing. Specifically, the third encryption may comprise a one way hash function configured to implement a specific one way hashing algorithm. The one way hash function may be configured to receive as input data having a variable length and to return as output a sequence of binary data having a fixed length. The one way hash function may also receive as input a secret key. For the same input value, the one way hash function may return different output values for different secret keys.

In an embodiment of the present invention, a confirmation value for a definable unit of data is computed by inputting the definable unit of data and a secret key to a one way hash function. The one way hash function implements a specific algorithm for one way hashing. Any of a variety of one way hash functions known in the art may be used to generate the confirmation value. The one way hash function may be configured to return a binary string 128 bits in length as its result. The binary string may be converted to a textual form by employing any of the methods previously discussed in regards to the first encryption. The one way hash function may also be configured to return textual data or numeric data.

It is noted that if a data store discovers the secret key, it gains the capability to generate confirmation values for arbitrary data. In this case, there is a risk that the data store can transmit incorrect data without detection because it can generate confirmation values for incorrect data which cause the incorrect data to be determined to be correct. Therefore, it is contemplated that the third encryption comprises a one way hash function for which it is computationally infeasible for the data store to discover the secret key despite its knowledge of both the encrypted definable unit of data and the confirmation value. In this case, it is very unlikely that the data store can perform unauthorized changes to a definable unit of data without the unauthorized change being detected due to the incorrect data not matching the confirmation value.

It is contemplated that the third encryption is applied to the result of encrypting a definable unit of data using the first or second encryption as opposed to the original, plaintext form of the definable unit of data. Otherwise, for the same secret key, a hash function will return the same result for data in the primary data set and its corresponding data in the secondary data set. In this case, a data store may determine the correspondence between data encrypted using the first encryption and its corresponding data encrypted using the second encryption simply by inspecting the confirmation values. This is problematic because the method of the present invention may be compromised if the data store discovers the identities of records which correspond to each other.

At modifying operation 408, mathematical modifications may be applied to one or more confirmation values to provide meta-information about the definable unit of data associated with each modified confirmation value. Modifying operation 408 may receive as input each confirmation value resulting from encrypting operation 406. Meta-information may include a specification of whether the definable unit of data was encrypted using the first encryption or the second encryption. Meta-information may also include a specification of whether plaintext data from which the definable unit of data was generated, encrypted using the second encryption if the definable unit of data is encrypted using the first encryption and encrypted using the first encryption if the definable unit of data is encrypted using the second encryption, is also stored. In other words, meta-information may include a specification of whether the definable unit of data corresponds to another definable unit of data stored at the data store encrypted using the other encryption. It is noted that the mathematical modifications applied to the confirmation value may therefore signify whether the definable unit of data is in Part I, Part II or Part III of the taxonomy shown in FIG. 2.

Each confirmation value input to modifying operation 408 is associated with a definable unit of data encrypted using the first encryption. Therefore, modifying operation 408 may perform a modification which indicates that the definable unit of data is encrypted using the first encryption. Some of the data encrypted using the first encryption corresponds to data encrypted using the second encryption, while other data encrypted using the first encryption does not correspond to data encrypted using the second encryption. If a definable unit of data in the primary data set was selected during selecting operation 404 for inclusion in the secondary data set, the definable unit of data will correspond to data encrypted using the second encryption. Accordingly, modifying operation 408 may perform a modification which indicates that the same data, encrypted using the second encryption, is also stored at the data store. Conversely, if a definable unit of data in the primary data set was not selected during selecting operation 404 for inclusion in the secondary data set, the definable unit of data will not correspond to data encrypted using the second encryption. Accordingly, modifying operation 408 may perform a modification which indicates that the same data, encrypted using the second encryption, is not also stored at the data store.

In an embodiment of the present invention, a value may be added to one or more confirmation values resulting from encrypting operation 406. The value added to a confirmation value may indicate the type of encryption applied to the definable unit of data associated with the confirmation value. The added value may further indicate whether the definable unit of data corresponds to another definable unit of data encrypted using the other encryption. If the definable unit of data is encrypted using the first encryption and does not correspond to a definable unit of data encrypted using the second encryption (e.g., it is in Part I of the taxonomy of FIG. 2), the confirmation value resulting from encrypting operation 406 is used without modification. It is noted that this is equivalent to adding the number zero to the confirmation value because zero is the additive identity. If the definable unit of data is encrypted using the first encryption and also corresponds to a definable unit of data encrypted using the second encryption (e.g., it is in Part II), the number one is added to the confirmation value. If the definable unit of data is encrypted using the second encryption (e.g., it is in Part III), the number two is added to the confirmation value.

According to this embodiment, modifying operation 408 may not modify a confirmation value if its associated definable unit of data was not selected by selecting operation 404. Modifying operation 408 may add the number one to a confirmation value if its associated definable unit of data was in fact selected by selecting operation 404.

The confirmation value may be configured to have the same length as the result of encrypting operation 406. For example, if encrypting operation 406 is configured to return a value 128 bits in length, the confirmation value may likewise be 128 bits in length. In this case, mathematical modifications such as the exemplary adding operation described above may cause an arithmetic overflow. For example, suppose that when a definable unit of data encrypted using the first encryption and corresponding to a definable unit of data encrypted using the second encryption is input to a one way hash function, the result is the binary representation of $2^{128}-1$. Adding 1 to this result according to the algorithm described above yields a result of $2^{128}$. This result is too large to be expressed in 128 bits. Such an arithmetic overflow may be resolved by computing the result of the mathematical modifications modulo the number of possible result values of the one way hash function. Continuing the preceding example, the resulting confirmation value would be $2^{128}$ mod $2^{128}$, which equals the binary representation of zero. The modulo operation may be performed by disregarding any bit positions which are more significant than the most significant bit position in the definition of the confirmation value.

It is noted that even when applying mathematical modifications to a confirmation value to provide meta-information about a definable unit of data, the probability of randomly guessing a valid confirmation value is very low. If confirmation values are generated by a one way hash function configured to generate a result 128 bits in length, there exist $2^{128}$ possible, distinct confirmation values. If the modifying algorithm outlined above is applied to the result of the one way hash function, only 3 valid values exist for a specific definable unit of data. Specifically, the only valid values are the result of the one way hash function incremented by either 0, 1 or 2. Under these assumptions, the probability that a randomly selected value is a valid confirmation value for a specific definable unit of data is $2/3^{128}$, or approximately $8.82 \times 10^{-39}$.

It is contemplated that a data store cannot discover from a mathematically modified confirmation value which encryption was applied to its associated definable unit of data and whether the definable unit of data corresponds to another definable unit of data encrypted using the other encryption. This is because it is computationally infeasible for the data store to determine the result of the third encryption (e.g., the valid but unmodified confirmation value) for the definable unit of data. Therefore, the data store cannot compare the unmodified confirmation value to the actual, modified confirmation value to determine which modification was applied to the definable unit of data.

It is noted that although the mathematical modifications may include an indication of whether data from the primary data set are included in the secondary data set, selecting operation 402 need not precede modifying operation 408. As previously noted, data may be selected for inclusion in the secondary data set according to a predefined algorithm. Modifying operation 408 may itself employ this algorithm and may modify a confirmation value based on the resulting knowledge of whether the definable unit of data associated with the confirmation value will be selected for inclusion in the secondary data set.

At encrypting operation 410, the secondary data set is encrypted using a second encryption. The result of this operation is an encrypted secondary data set. The second encryption may comprise any of a wide variety of encryption techniques known in the art. The second encryption may employ the same encryption algorithm as the first encryption but may input a different secret key to the algorithm than the secret key used for the first encryption. It is contemplated that as with the first encryption, the second encryption transforms the plaintext data so that it is computationally infeasible to discover the plaintext data based on the encrypted data without knowing the encryption key. Furthermore, it is contemplated that it is computationally infeasible to determine whether a definable unit of data is encrypted using the first encryption or the second encryption without having the ability to decrypt the definable unit of data.

The second encryption may comprise inputting plaintext data and a secret key to an encryption function. The encryption function may be the same as the encryption function implementing the first encryption. However, the secret key input to the encryption function to apply the second encryption may be different than the secret key input to the encryption function to apply the first encryption. As with the first encryption, the encryption function may be configured to return a binary string as a result. The binary string may be converted to a textual form by employing any of the methods previously discussed in regards to the first encryption. The encryption function may also be configured to return textual data or numeric data.

As with the first encryption, the second encryption may be applied to all data in the secondary data set. Specifically, the secondary data set may be subdivided into a plurality of definable units of data, wherein the definable units of data are disjoint. Each definable unit of data may then be encrypted using the secondary encryption. The second encryption may be performed in a manner such that the field to which a specific segment of encrypted data belongs may be determined without decrypting the data. This may advantageously facilitate executing queries against data encrypted using the second encryption and indexing stored data encrypted using the second encryption. For each tuple in the secondary data set, the same secret key may be input to an encryption function implementing the second encryption. In an embodiment of the present invention, the secondary data set is structured according to a relational paradigm, and each tuple within the secondary data set is separately encrypted using the secondary encryption.

As with the first encryption, it is contemplated that any unique identifiers are encrypted by the second encryption along with the rest of the data. Additionally, as with the first encryption, the second encryption may be order preserving.

At encrypting operation 412, one or more definable units of data included in the encrypted secondary data set may be further encrypted using a third encryption to determine a confirmation value. The third encryption may be the same as the third encryption applied during encrypting operation 406. Therefore, encrypting operation 412 may perform steps which are substantially similar to the steps performed during encrypting operation 406. In an embodiment of the present invention, the encrypted secondary data set is structured according to a relational paradigm, and a separate confirmation value is determined for each tuple of the encrypted secondary data set.

At modifying operation 414, mathematical modifications may be applied to one or more confirmation values to provide meta-information about the definable unit of data corresponding to each modified confirmation value. Meta-information may comprise the same elements previously discussed in regards to modifying operation 408. Modifying operation 414 may comprise mathematical operations which are substantially similar to those performed during modifying operation 408.

Confirmation values received by modifying operation 414 are associated with definable units of data from the secondary data set. Therefore, modifying operation 414 may perform a modification which indicates that the definable unit of data is encrypted using the second encryption. In the exemplary algorithm of FIG. 4A, all data encrypted using the second encryption and stored at the data store corresponds to data encrypted using the first encryption and stored at the data store. Therefore, the confirmation value may also be modified to indicate that same data, encrypted using the first encryption, is also stored. According to the exemplary algorithm outlined above regarding modifying operation 408, modifying operation 414 may add the number two to a confirmation value.

At combining operation 416, the encrypted primary data set resulting and the encrypted secondary data set may be combined into a single encrypted data set. Specifically, the result of encrypting operation 404 and the result of encrypting operation 410 may be combined. Any confirmation values associated with the encrypted primary data set and/or the encrypted secondary data set may be included in the combined encrypted data set. Specifically, if confirmation values were generated and were mathematically modified, the result of modifying operation 408 and of modifying operation 414 (e.g., the modified results of the third encryptions) may be included in the combined data set. If confirmation values were generated but were not mathematically modified, the result of encrypting operation 406 and of encrypting operation 412 (e.g., the unmodified results of the third encryptions) may be included in the combined data set.

It is contemplated that combining operation 416 is performed in a manner that minimizes the risk that the data store will determine data correspondence between the encrypted primary data set and the encrypted secondary data set. If the combined encrypted data set is arranged in such a way that the data store can determine whether data was encrypted using the first encryption or the second encryption based on the position of the data within the combined encrypted data set, the data store may be able to use this information to defeat the method of the present invention. Thus, in an embodiment of the present invention, the combined encrypted data set is sorted on the encrypted values of a unique identifier without regard to whether the definable unit of data identified by the unique identifier was encrypted using the first encryption or the second encryption. In another embodiment of the present invention, the combined encrypted data set is sorted randomly, without regard to the values of any unique identifiers or to the type of encryption applied to any particular definable unit of data.

At storing operation 418, the encrypted primary data set and the encrypted secondary data set are stored at the data store. Specifically, the output of combining operation 416 is transmitted to the data store. It is noted that upon successful completion of storing operation 418, the encrypted primary data set, the encrypted secondary data set and any confirmation values are located at the data store.

The encrypted primary data set and the encrypted secondary data set may be stored in a single definable subset of the data store. This beneficially prevents the data store from determining which encryption was applied to a unit of data based on the subset of the data store at which the unit of data is located. It is contemplated that the data store cannot determine which encryption was applied to a unit of data by analyzing the data itself. Therefore, the data store may be unable to determine which encryption was applied to a unit of data. In an embodiment of the present invention, both encrypted data sets may be stored within the same table of a relational database.

Storing operation 418 may comprise any of a variety of means for transmitting data to the data store. Data may be stored at the data store using queries configured to modify data located at a data store. Specifically, queries comprising the INSERT, UPDATE and DELETE primitives defined by Structured Query Language may be issued to a data store to manipulate the contents of the data store. Data may also be replicated to a data store. Replication is a set of methods known in the art for reproducing a data store or a subset thereof and storing the copy at another data store. Data may even be encoded on computer readable storage media, including without limitation tapes, CD-ROM discs and floppy discs, and physically transported to the entity managing the data store.

If the preceding operations were successful, the primary data set is now stored at the data store in dually encrypted form. It is therefore possible to issue queries against the stored data.

Processing may continue with the operations shown in FIG. 4B. The set of operations shown in FIG. 4B (e.g., those beginning with querying operation 420 and ending with determining operation 450) may be implemented and/or envisioned as a function called "queryRewrite( )". This set of operations issues at least one substantive query to a data store. Furthermore, this set of operations attempts to provide an assurance that the result of the substantive queries are correct and complete. This assurance may be based on a user-defined confidence level. It is noted that this set of operations may be performed by a query interface as shown in FIG. 3.

It is noted that a significant amount of time may elapse between the dataTransform( ) operations outlined above and the queryTransform( ) operations outlined below. Once data are stored at a data store according to the dataTransform( ) operations, processing may begin at querying operation 420 at any time in the future in order to perform queries against data stored at the data store and to validate the results of these queries. It is further noted that once data are stored at a data store according to the dataTransform( ) operations, a plurality of systems may perform the queryTransform( ) operations in parallel in order to issue queries against the data store.

At querying operation 420, a substantive query is issued against the data store. The substantive query is configured to return a primary data result belonging to the primary data set. This may be achieved by modifying the substantive query so that one or more parameters included in the query are encrypted using the first encryption.

It is noted that the system originally issuing the substantive query may be different from the system modifying the original form of the substantive query in order to match data encrypted using the first encryption. For example, a client not configured to encrypt and decrypt data using the first encryption may transmit a plaintext query to a query interface, which may modify the plaintext query to match data encrypted using the first encryption. Thus, querying operation 420 may comprise waiting until a plaintext query is available for processing.

In an embodiment of the present invention, querying operation 420 comprises modifying an identity query configured to retrieve a result which is a subset of a single definable subset of a data store. If the data store is relational, the identity queries may be configured to retrieve a subset of the tuples stored in a single table of the data store. The queries may be configured to test equality and other logical comparison predicates. The queries may be coded in the Structured Query Language (SQL.) Thus, the queries may include SELECT clauses configured to retrieve a set of tuples matching a set of predicates. Specifically, the modifying operation may be configured to modify SQL queries expressed in the following form:

SELECT * FROM <table> WHERE <predicate>

In the preceding expression, <table> is the name of a table from which results are to be retrieved. <predicate> is a Boolean expression specifying which tuples should be retrieved from the table. Specifically, a tuple is included in the result of the query if and only if the predicate evaluates to True for that tuple. A predicate may include zero or more literals. A literal compares two quantities, resulting in a Boolean value (e.g., either True or False.) If the predicate includes zero literals, the word "WHERE" is omitted from the query. Those skilled in the art will appreciate that this special case requests the retrieval of all tuples in a table. If two or more literals are included in the predicate, they may be combined using Boolean algebra. For example, the predicate "WHERE <literal_1> AND <literal_2>" matches only those results for which both <literal_1> and <literal_2> evaluate to True.

Each literal of the predicate may be expressed in the form:
<$a_i$> <cond> <$v_i$>

In the preceding expression, <$a_i$> is an attribute such as the name of a column in a relational data set. <cond> is an operator. Operators may include without limitation =(equality), < > (inequality), > (greater than), >=(greater than or equal to), <(less than) and <=(less than or equal to). <$v_i$> is a value in the domain of <$a_i$>. Specifically, if <$a_i$> is the name of a column, <$v_i$> must be of a type which may be stored in the column denoted by <$a_i$>. It is noted that a criterion specifying a range with both an upper and a lower bound can be effected by combining two inequality literals with a Boolean AND operator.

In this embodiment, the modifying operation encrypts each plaintext value <$v_i$> using the first encryption. It then replaces each plaintext value with its encrypted form. For example, consider the following query, which is configured to retrieve a tuple in a table named "customers" which pertains to a customer for whom an identifier named "customerId" has a value of 1000:

SELECT * FROM customers WHERE customerId=1000

In this query, the value 1000 is encrypted using the first encryption, and the plaintext form of 1000 is replaced with the result of the encrypting operation.

As another example, consider the following query configured to retrieve all orders having a type code of 2 and a total sale amount less than 100 units of currency:

SELECT * FROM orders
WHERE type=2
AND totalAmount<100

In this query, the value 2 is encrypted using the first encryption, and the plaintext form of 2 is replaced by the result of the encrypting operation. Also, the value 100 is encrypted using the first encryption, and the plaintext form of 100 is replaced by the result of the encrypting operation. It is noted that range queries such as the exemplary query above may require the first encryption and the second encryption to be order preserving.

Those skilled in the art will appreciate that the Structured Query Language includes many constructs not listed above. Furthermore, even when using only the constructs listed above, many valid SQL queries are not expressed in the form described above. It is emphasized that the present invention is not limited to queries which are expressed in the form outlined above. One skilled in the art may extend the exemplary algorithm outlined above in order to modify queries not expressed in the form described above. Furthermore, it is noted that many queries not expressed in the form described above are logically equivalent to queries which may be written in the form outlined above. Such queries may therefore be semantically transformed into the form described above so that they may be modified according to the exemplary algorithm outlined above. An example of this case is the following original query, which is configured to retrieve all tuples in a table named "customers" which pertain to customers for whom an identifier named "customerId" has a value of either 1111, 2222 or 3333:

SELECT * FROM customers WHERE customerId IN (1111, 2222, 3333)

The following revised query is logically equivalent to the original query, and will therefore retrieve the same tuples:

SELECT * FROM customers
WHERE customerId=1111
OR customerId=2222
OR customerId=3333

The original query may be semantically transformed into the revised query. The values 1111, 2222, and 3333 are then encrypted using the first encryption, and each plaintext value is replaced by its encrypted form.

At receiving operation 422, a primary data result is received in response to the substantive query issued in querying operation 420. Data in the primary data result will generally be encrypted using the first encryption. Data encrypted using the first encryption may be decrypted using the first encryption. For reasons discussed below, a subset of the received data may be encrypted using the second encryption. It is contemplated that this subset is small in comparison to the total quantity of data received. Data encrypted using the second encryption may be deleted from the received query result.

The primary data result received in receiving operation 422 may include confirmation values. Each confirmation value may be associated with a definable unit of data included in the primary data result. The confirmation values may be results of modifying operation 408 and modifying operation 414. If the data store is structured according to a relational paradigm, each tuple received may include a confirmation value relating to the remainder of the tuple.

Accordingly, at analyzing operation 424, one or more definable units of data returned in response to the substantive query and their corresponding confirmation values are analyzed. Specifically, each confirmation value included in the primary data result may be analyzed in comparison to its associated definable unit of data also found in the primary data result.

In an embodiment of the present invention, for the plaintext form of each definable unit of data in the received query result, the definable unit of data and a secret key are input to a one way hash function. The one way hash function and secret key are identical to those initially employed to generate the confirmation values. The result calculated by the hash function is compared to the confirmation value in the received query result which corresponds to the definable unit of data. If mathematical modifications were applied to the confirmation values stored at the data store, the returned confirmation value may be determined to be valid if it equals any value potentially resulting from applying the mathematical modifications to the result of the hash function. For example, if the confirmation values stored at the data store were modified using the algorithm outlined above in regards to modifying operation 408, the returned confirmation value may be determined to be valid if and only if it is a member of the set $\{r, r+1, r+2\}$, where r equals the result of the hash function.

In a further embodiment of the present invention, analyzing a returned confirmation value comprises determining meta-information about the definable unit of data corresponding to the confirmation value. Specifically, analyzing may result in a determination, based on the confirmation value, whether the definable unit of data was encrypted using the first encryption or the second encryption. Analyzing may also result in a determination of whether plaintext data from which the definable unit of data was generated, encrypted using the second encryption if the definable unit of data is encrypted using the first encryption and encrypted using the first encryption if the definable unit of data is encrypted using the second encryption, is also stored at the data store.

In an embodiment of the present invention, wherein the third encryption comprises a one way hashing function mathematically modified according to the exemplary algorithm described above, the definable unit of data and the secret key are input to the one way hash function. The result is subtracted from the returned confirmation value to obtain the quantity added to the returned confirmation value. If the result of the subtracting operation is zero, the defined unit of data is known to be encrypted with the first encryption and to not correspond to data encrypted with the second encryption (e.g., the defined unit of data is in Part I of the taxonomy of FIG. 2.) If the result is one, the defined unit of data is known to be encrypted with the first encryption and to correspond to data encrypted with the second encryption (e.g., the defined unit of data is in Part II.) If the result is two, the defined unit of data is known to be encrypted with the second encryption (e.g., the defined unit of data is in Part III.) It is noted that if the result is any other value, the defined unit of data would already have been determined not to be valid.

Counterintuitively, a defined unit of data may be determined to be encrypted using the second encryption even when it was returned in response to a substantive query configured to retrieve data encrypted using the first encryption. This is possible because the ranges of the first encryption and the second encryption may overlap. In other words, for some first encryptions and second encryptions, it is possible for the result of encrypting a plaintext value using the first encryption to equal the result of encrypting a different plaintext value using the second encryption.

Any data thus identified as encrypted using the second encryption may be deleted from the received query result. This is advantageous because the plaintext form of data encrypted using the second encryption may not be included in the range of plaintext values the substantive query was configured to match. In the unlikely event that the plaintext form of data encrypted using the second encryption is in fact included in the range of plaintext values the substantive query was configured to match, data matching the plaintext value encrypted using the first encryption will also have been included in the query results. In either case, the data encrypted using the second encryption are extraneous and may be safely removed.

This issue may be avoided by selecting the first encryption and the second encryption so that their ranges do not overlap. In other words, the encryption methods may be selected so that no value resulting from the first encryption may also result from the second encryption, and vice versa. Careful selection of the encryption methods in this manner ensures that queries configured to return data encrypted using the first encryption do not return data encrypted using the second encryption and vice versa. This may advantageously reduce processing time and bandwidth requirements.

At determining operation 426, it is determined whether each definable unit of data for which the associated confirmation value was analyzed during analyzing operation 424 is correct. Specifically, it is determined whether each definable unit of data is equivalent to data previously stored at the data store by a database owner. If all definable units of data are determined to be correct, processing continues with determining operation 432. If one or more definable units of data are determined not to be correct, control passes to notifying operation 428.

At notifying operation 428, a data invalid notification is provided. A wide variety of actions may be taken in response to this notification. For example, control may revert to querying operation 420 in order to repeat the substantive query. Alternatively, any definable unit of data determined to be false may be removed from the primary data result. As another possibility, interaction with the data store which returned the false result may cease. This may be effected by terminating the present sequence of operations.

At buffering operation 430, the primary data result or a subset thereof may be buffered for subsequent use by analyzing operation 444. The substantive query itself may also be buffered to facilitate generating a validating query. In an embodiment of the present invention, only that subset of the primary data result which is encrypted using the first encryption and which corresponds to data using the second encryption is buffered. In other words, only data included in Part II of the taxonomy of FIG. 2 are buffered. This is advantageous because analyzing operation 444 only considers data encrypted using the first encryption if it corresponds to data encrypted using the second encryption. As a result, the proportion of the query results which are buffered may be equal to or may approximate the replication factor.

At determining operation 432, it is determined whether a validating query should be issued at this time. If not, control returns to querying operation 420. If so, processing continues with querying operation 434.

A validating query may be issued in order to validate a specific number of substantive queries. In this case, determining operation 432 may comprise counting the number of substantive queries issued subsequently to the most recent validating query. Those skilled in the art will appreciate that this may be achieved by incrementing a counter variable each time a substantive query is issued and comparing the value of the counter variable to the number of substantive queries which a validating query should validate. If the number of substantive queries issued is less than the desired number, control may return to querying operation 420. Otherwise, processing may continue with querying operation 434.

At querying operation 434, a validating query is issued against the data store. The validating query is configured to return a secondary data result belonging to the secondary data set. To achieve this goal, the validating query may be configured to retrieve data encrypted using the second encryption. The validating query may be generated in order to retrieve encrypted data generated from the same plaintext data as encrypted data received in response to the at least one substantive query. The exemplary operations demonstrated in FIG. 5 may be performed to generate the validating query. In an embodiment of the present invention, a plurality of validating queries may be issued during a single iteration of querying operation 434.

At receiving operation 436, a secondary data result is received in response to the validating query issued during querying operation 434. Data in the secondary data result will generally be encrypted using the second encryption. Data encrypted using the second encryption may be decrypted using the second encryption. For the reasons discussed above, a subset of the received data may be encrypted using the first encryption. It is contemplated that this subset is small in comparison to the total quantity of data received. Data encrypted using the first encryption may be deleted from the secondary data result. As with the primary data result, the secondary data result may include confirmation values.

Accordingly, at analyzing operation 438, one or more definable units of data returned in response to the validating query and their corresponding confirmation values are analyzed. Specifically, each confirmation value included in the secondary data result may be analyzed in comparison to its associated definable unit of data also found in the secondary data result. Analyzing operation 438 may be performed according to the same algorithm described above regarding analyzing operation 424. However, instead of removing data determined to be encrypted using the second encryption as in analyzing operation 424, data determined to be encrypted using the first encryption may instead be removed.

At determining operation 440, it is determined whether each definable unit of data for which the associated confirmation value was analyzed during analyzing operation 438 is correct. Specifically, it is determined whether each definable unit of data is equivalent to data previously stored at the data store by a database owner. If all definable units of data are determined to be correct, processing continues with analyzing operation 444. If one or more definable units of data are determined not to be correct, control passes to notifying operation 442.

At notifying operation 442, a data invalid notification is provided. A wide variety of actions may be taken in response to this notification. In particular, any action described above regarding notifying operation 428 may also be performed during notifying operation 442.

At analyzing operation 444, at least one primary data result received during receiving operation 422 in response to the at least one substantive query and at least one secondary data result received during receiving operation 436 in response to the at least one validating query are analyzed. The analysis may determine whether the at least one primary data result is correct and complete. Correctness may be defined as a state where data received in response to the at least one substantive query is equivalent to data previously stored at the data store by a database owner. Completeness may be defined as a state where data received in response to the at least one substantive query includes all data previously stored at the data store by a database owner, and not subsequently removed or modified by the database owner, which matches the at least one substantive query.

Analyzing operation 444 may determine whether any definable unit of data included in a decrypted secondary data result, the definable unit of data satisfying one or more of the at least one substantive queries, is not contained in any primary data result. As previously noted, a subset of the data encrypted at the data store and encrypted using the first encryption corresponds to data encrypted at the data store and encrypted using the second encryption. Thus, if data belonging to this subset are returned in response to a substantive query, the corresponding data encrypted using the second encryption should be returned in response to a validating query whose matching criteria are a superset of the matching criteria of the substantive query. Accordingly, analyzing operation 444 may employ the result of analyzing operation 424 to determine which definable units of data in the at least one primary data result correspond to data stored at the data store and encrypted using the second encryption. Analyzing operation 444 may confirm that each decrypted definable unit of data thus identified is included in the decrypted secondary data result.

The algorithm outlined above may advantageously increase the likelihood of detecting incomplete data returned by a data store. We may consider data to be deleted if the data was previously stored at the data store by a database owner, was not subsequently removed or modified by the database owner and was not returned in response to a substantive query matching that data. This is the case whether the data was not returned due to actively being removed from a query result, due to incomplete or incorrect execution of a query or due to any other cause. Deletions may be classified as either replication deletions or non-replication deletions. A replication deletion is the deletion of data which corresponds to data stored at the data store using the other encryption. A non-replication deletion is the deletion of data which does not correspond to data stored at the data store using the other encryption.

Replication deletion of data may be detected because if data returned in response to a substantive query corresponds to data encrypted using the other encryption, a validating query configured to return data encrypted using the other encryption and having matching criteria which are a superset of the matching criteria of the substantive query should return the corresponding data.

Analyzing operation 444 may fail to detect a non-replication deletion. However, it is contemplated that a data store is not aware of whether a particular definable unit of data corresponds to data encrypted using the other encryption. It follows that a data store can only randomly delete data without regard to whether the deleted data corresponds to data encrypted using the other encryption. However, if a data store randomly deletes a quantity of data which is not minimal, it is very likely that at least one deletion is a replication deletion and that, as a result, the deletion may be detected.

In an embodiment of the present invention, analyzing operation 444 may be probabilistic or statistical in nature. Specifically, analyzing operation 444 may comprise determining whether the confidence that data returned by a data store is correct and complete is greater than or equal to a user-specified confidence level. For example, analyzing operation 444 may attempt to determine whether, with 99% confidence, the data returned by a data store is correct and complete.

The probability that a deletion occurred may be calculated even if it is not known (e.g., by analyzing confirmation values) which data correspond to data encrypted using the other encryption. Let N be the quantity of data returned in response to the at least one substantive query which also satisfy the validating query. Let M be the quantity of data returned in response to the validating query. In an embodiment of the present invention, M and N are quantities of tuples of relational data. Validating queries may be configured to return data encrypted using the second encryption. The proportion of the data encrypted using the first encryption which is also encrypted using the second encryption may approximately equal the replication factor, denoted r. Under these assumptions, it follows that the expected value of M is rN. If there is no deletion attack, the Chernoff bound, a mathematical technique known in the art, specifies that:

$$Pr[M < (1 - \delta)rN] = e^{\frac{-\delta^2 rN}{2}}$$

It follows that if the probability calculated according to the above equation is less than a user-defined threshold, it may be determined that the results are not complete.

At determining operation 446, it is determined whether the results returned in response to the at least one substantive query are correct and complete. If so, control passes to determining operation 450. If not, control passes to notifying operation 448.

At notifying operation 448, a data invalid notification is provided. A data invalid notification may be provided if data received in response to the at least one substantive query is not equivalent to data previously stored at the data store by a database owner. A data invalid notification may also be provided if data received in response to the at least one substantive query does not include all data previously stored at the data store by a database owner, and not subsequently removed or modified by the database owner, which matches the at least one substantive query. A wide variety of actions may be taken in response to this notification. In particular, any action described above regarding notifying operation 428 may also be performed during notifying operation 448.

At determining operation 450, it is determined whether another substantive query remains to be issued. If so, control returns to querying operation 420. If not, the present set of operations is complete.

Turning now to FIG. 5, an exemplary sequence of operations for generating a validating query is demonstrated. The validating query may be generated in order to validate at least one substantive query.

The validating query is configured to return a secondary data result belonging to the secondary data set. Because the secondary data set is encrypted using the second encryption, the validating query is configured to return data encrypted using the second encryption. The validating query may be generated in order to retrieve encrypted data generated from the same plaintext data as encrypted data received in response to the one or more substantive queries. It is noted that the validating query need not be configured to retrieve all data in the secondary data set which corresponds to data in the primary data set returned in response to one or more of the substantive queries. Instead, the matching criteria of substantive queries may be iteratively combined until a predefined overlap threshold is reached. Furthermore, for reasons explained below, the validating query may be configured to retrieve data which does not correspond to data returned in response to any of the substantive queries.

The validating query may be configured to maximize the overlap between its result and the results of the one or more substantive queries. The validating query may also be configured to minimize the quantity of data returned which do not correspond to data returned in response to any of the substantive queries.

At initializing operation 502, a validating query may be instantiated. The matching criteria of the validating query may initially be configured to match no data.

The validating query may be internally represented as a textual form of computer code configured to perform the validating query. The validating query may also be internally represented as any of a wide variety of data structures known in the art which facilitate the symbolic manipulation of computer code.

At selecting operation 504, one of the at least one substantive queries is selected. The selection may be random. The selection may also be based on a predefined algorithm. In an embodiment of the present invention, queries selected during previous iterations of selecting operation 504 are not selected during the current iteration.

At relaxing operation 506, the matching criteria of the substantive query selected during selecting operation 504 are relaxed. Relaxing may involve modifying the matching criteria so that the modified matching criteria are a superset of the matching criteria of the selected query. Specifically, the modified matching criteria may match all data matched by the selected query and may additionally match one or more values not matched by the matching criteria of the selected query.

In an embodiment of the present invention, relaxing operation 506 may transform the selected substantive query by rewriting one or more conditional expressions. Each conditional expression which is rewritten is replaced by its modified form. The substantive query may be expressed in the form outlined above in regards to modifying a plaintext query to match data encrypted using the first encryption.

The specific manner in which a conditional expression is rewritten may depend on the type of conditional expression. A literal which evaluates to True if and only if a field equals a specific value may be modified by additionally allowing the field to equal one or more alternate values. The one or more alternate values may be randomly selected from the domain of the field, e.g., the set of values which the data store allows to be stored in that field. To achieve this goal, a second literal may be generated which evaluates to True if and only if the field equals a selected alternate value. A third literal may be generated which performs a logical AND operation on the results of the first literal and the second literal. The preceding two operations may be repeated in order to include additional alternate values.

A literal which evaluates to True if and only if a field is greater than a lower bound and is lesser than an upper bound may be modified by reducing the lower bound and increasing the upper bound. Specifically, a non-negative number may be subtracted from the lower bound. The literal may be rewritten so that the resulting value replaces the lower bound. Likewise, a non-negative number may be added to the upper bound. The literal may be rewritten so that the resulting value replaces the upper bound. The numbers subtracted from the lower bound and added to the upper bound may be randomly selected.

A conditional expression joining two literals using a logical AND operation, a logical OR operation or a logical XOR (exclusive or) operation may be modified by modifying both literals according to the algorithm described above.

Conditional expressions not expressed in any of the forms listed above may be unmodified. However, it is noted that those skilled in the art may modify the exemplary algorithm detailed above to include operations to relax conditional expressions not expressed in a form listed above.

Performing relaxing operation 506 advantageously reduces the risk that a data store will return incomplete data. This is because if a data store obtains an awareness that a query configured to retrieve data encrypted using the first encryption corresponds to a query configured to retrieve data encrypted using the second encryption, the data store may use this awareness to return incomplete data without detection. If a validating query is semantically similar to the one or more substantive queries which it was constructed to validate, a data store may semantically analyze the queries and may determine that the validating query corresponds to the at least one substantive query. The data store may thus determine that the data returned by the validating query correspond to the data returned by the at least one substantive query.

If a data store is aware that a first set of data encrypted using the first encryption corresponds to a second set of data encrypted using the second encryption, it may delete both sets of data. The data store may then execute queries subsequently received against the altered data stored thereat. Such an unauthorized deletion may not be detected because for any definable unit of data encrypted using both the first encryption and the second encryption and stored in both forms at the data store, both the form encrypted using the first encryption and the form encrypted using the second encryption will have been deleted. Thus, for any definable unit of data from the primary data set, the corresponding definable unit of data will also have been deleted from the secondary data set.

Similarly, a data store may delete all data excepting the results of the at least one substantive query and the validating query. Again, the data store may then execute queries subsequently received against the altered data stored thereat. Such an unauthorized deletion may not be detected because for any definable unit of data encrypted using the first encryption and having a confirmation value mathematically modified to indicate that the definable unit of data corresponds to a definable unit of data encrypted using the second encryption and stored at the data store, the definable unit of data encrypted using the second encryption is in fact stored at the data store.

To demonstrate how a data store may semantically analyze queries to determine data correspondence, suppose that the following substantive query is executed against a relational data store:

SELECT * FROM orders WHERE orderId=5000

The parameter, 5000, may be encrypted using the first encryption in the substantive query. If the same query is submitted as a validating query, the parameter, 5000, may instead be encrypted using the second encryption. If the data store semantically analyzes the substantive query in comparison to the validating query, it may determine that the first encryption of the parameter 5000 corresponds to the second encryption of the parameter 5000. The data store may thus delete the results of the substantive query and the validating query from the data. Specifically, the data store may delete both the tuple having an orderId of 5000 encrypted using the first encryption and the tuple having an orderId of 5000 encrypted using the second encryption from the orders table. This deletion may be undetectable.

At appending operation 508, the matching criteria may be modified to comprise a union of the result of relaxing operation 506 and the current matching criteria of the validating query. It is noted that when only one substantive query has been selected, the validating query will have the same matching criteria as the result of applying relaxing operation 506 to the selected substantive query. This is identically true because the union of a first set and the empty set is the first set. Accordingly, on the first iteration of appending operation 508, the matching criteria resulting from relaxing operation 506 may simply replace the current matching criteria of the validating query. In an embodiment of the present invention, instantiating operation 502 may be omitted, and the first iteration of appending operation 508 may store the result of relaxing operation 506 as the validating query.

At determining operation 510, it is determined whether the quantity of data expected to be returned in response to the current form of the validating query equals or exceeds an overlap threshold multiplied by a quantity of data in a union of the data returned in response to the at least one substantive query. If so, control returns to selecting operation 504. If not, processing continues with modifying operation 512.

The overlap threshold may specify an exact or approximate ratio for the quantity of data returned in response to the validating query to the quantity of data returned in response to any substantive query and corresponding to data encrypted using the second encryption. It is noted that the overlap threshold should be interpreted as an intended lower bound. For example, if the overlap threshold is 0.5 and if 20 tuples corresponding to data encrypted using the second encryption were returned in response to a substantive query, the result of the validating query may include approximately 10 tuples. The overlap threshold may be a constant.

In an embodiment of the present invention, a first variable is initialized to zero. Iteration is then performed over the set of substantive queries being validated. For each substantive query, the quantity of data returned in response to the query is added to the first variable. A second variable is also initialized to zero. Iteration is then performed over the set of queries previously selected during selecting operation 504. For each selected query, the quantity of data returned in response to the query is added to the second variable. If the second variable is less than the result of multiplying the first variable by the overlap threshold, control returns to selecting operation 504. Otherwise, processing continues with modifying operation 512.

In a further embodiment of the present invention, only data encrypted using both the first encryption and the second encryption are considered in determining the quantities of data. Accordingly, for the set of substantive queries being validated, only the quantity of data returned which corresponds to data encrypted using the second encryption is added to the first variable. Likewise, for each selected query, only the quantity of data returned which corresponds to data encrypted using the second encryption is added to the second variable.

By following the algorithm outlined above, selecting operation 504, relaxing operation 506 and appending operation 508 are repeated until the quantity of data expected to be returned in response to the validating query equals or exceeds a constant multiplied by a quantity of data in a union of the data returned in response to the at least one substantive query. It is noted that when generating a validating query to validate a plurality of substantive queries, one or more of the substantive queries may not be considered in generating the validating query. In particular, the exemplary algorithm outlined above for generating a validating query may terminate before the matching criteria of all the substantive queries are appended to the matching criteria of the validating query. Finally, it is noted that constructing a validating query to validate a plurality of substantive queries may beneficially reduce the risk that a data store may determine correspondence between the substantive queries and the validating query by semantically analyzing the queries.

Furthermore, it is noted that as a result of relaxing operation 506, the matching criteria in the validating query comprise a superset of the union of the matching criteria of the selected substantive queries. It is contemplated that the extraneous data matched by the validating query due to relaxing operation 506 does not diminish the effectiveness of validating the data. This is because any data which would not have been returned in response to the validating query if the matching criteria had not been relaxed will only match data which does not correspond to the result of any substantive query. Therefore, any such extraneous data will not be considered when checking data returned by a substantive query to ensure that it is also present in the validating query.

At modifying operation 512, the validating query is modified so that one or more parameters included in the query are encrypted using the second encryption. Modifying operation 512 may include the steps outlined above in regards to querying operation 420 for modifying a substantive query to match data encrypted using the first encryption, except that parameters are encrypted using the second encryption instead of the first encryption. The result of modifying operation 512 may be issued as a validating query.

Figure 6:
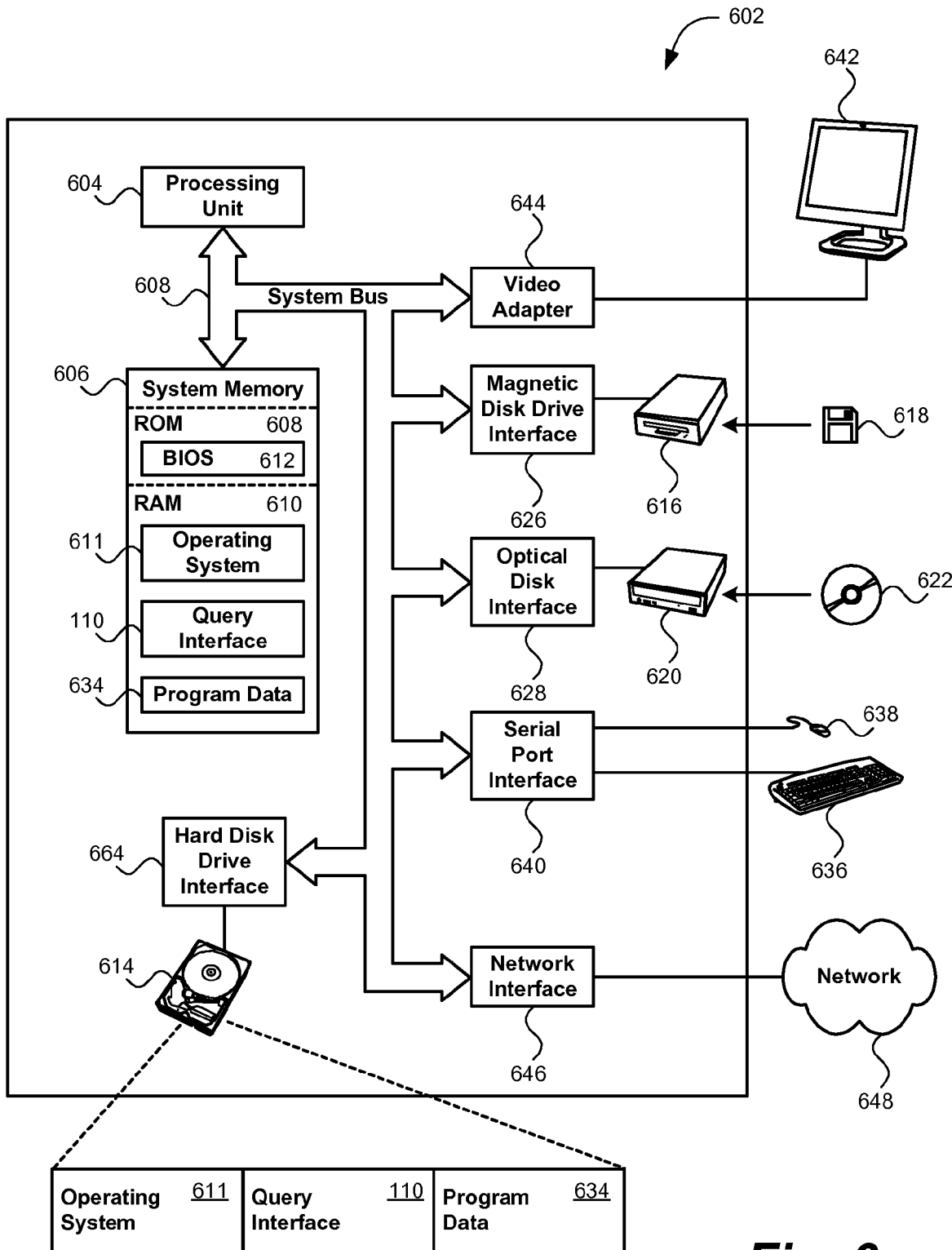
FIG. 6 shows an exemplary embodiment of a computer system embodying the present invention.

With reference to FIG. 6, an illustrative embodiment of a computer system 602 contemplated by the present invention is shown. The computer system 602 includes a processing unit 604, a system memory 606, and a system bus 608 that couples the system memory 606 to the processing unit 604. The system memory 606 includes read only memory (ROM) 608 and random access memory (RAM) 610. A basic input/output system (BIOS) 612, containing the basic routines that help to transfer information between elements within the computer system 602, such as during start-up, is stored in ROM 608.

The computer system 602 further includes a hard disk drive 614, a magnetic disk drive 616 (to read from and write to a removable magnetic disk 618), and an optical disk drive 620 (for reading a CD-ROM disk 622 or to read from and write to other optical media). The hard disk drive 614, magnetic disk drive 616, and optical disk drive 620 are connected to the system bus 608 by a hard disk interface 624, a magnetic disk interface 626, and an optical disk interface 628, respectively.

The drives and their associated computer-readable media provide nonvolatile storage for the computer system 602. Although computer-readable media refers to a hard disk, removable magnetic media and removable optical media, it should be appreciated by those skilled in the art that other types of media that are readable by a computer, such as flash memory cards, may also be used in the illustrative computer system 602.

A number of program modules may be stored in the drives and RAM 610, including an operating system 611, a query interface 114, program data 634, and other program modules (not shown). As discussed above, the query interface 114 is configured to issue validating queries against the data store and provide a data invalid notification if any definable unit of data included in an unencrypted form of the secondary data result is not contained in an unencrypted form of the primary data result, the definable unit of data satisfying the substantive query.

A user may enter commands and information into the computer system 602 through a keyboard 636 and pointing device, such as a mouse 638. Other input devices (not shown) may include a microphone, modem, joystick, game pad, satellite dish, scanner, or the like. These and other input devices are often connected to the processing unit through a serial port interface 640 that is coupled to the system bus 608.

A monitor 642 or other type of display device is also connected to the system bus 608 via an interface, such as a video adapter 644. In addition to the monitor, the computer system 602 may include other peripheral output devices (not shown), such as speakers and printers.

The computer system 602 operates in a networked environment using logical connections to one or more remote devices. The remote device may be a server, a router, a peer device or other common network node. When used in a networking environment, the computer system 602 is typically connected to the network 648 through a network interface 646. In a network environment, program modules depicted relative to the computer system 602, or portions thereof, may be stored in one or more remote memory storage devices.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device.

Computer program code for carrying out operations of the present invention may be written in an object oriented programming language such as Java, Smalltalk, C++ or the like.

However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

That which is claimed is:

1. A method for confirming the validity of data returned from a data store, the method comprising:
    encrypting a primary data set using a first encryption;
    storing the encrypted primary data set at the data store;
    encrypting a secondary data set using a second encryption, the secondary data set having fewer units of data than the primary data set;
    storing the encrypted secondary data set at the data store;
    encrypting at least one query, each query configured to return a primary data result belonging to the primary data set;
    issuing the encrypted query against the data store;
    issuing at least one validating query against the data store, each validating query configured to return a secondary data result belonging to the secondary data set;
    decrypting the secondary data result; and
    providing a data invalid notification if any definable unit of data included in an unencrypted form of the secondary data result is not contained in an unencrypted form of the primary data result, the definable unit of data satisfying one or more of the at least one query, wherein a definable unit of data is any identifiable, discrete subset of a data set.

2. The method of claim 1, further comprising storing the encrypted primary data set and the encrypted secondary data set in a single definable subset of the data store.

3. The method of claim 1, further comprising:
    encrypting the definable unit of data using a third encryption to determine a confirmation value;
    storing the confirmation value in conjunction with the definable unit of data; and
    analyzing the definable unit of data returned in response to a query and its corresponding confirmation value.

4. The method of claim 3, wherein the third encryption comprises one way hashing.

5. The method of claim 4, further comprising applying mathematical modifications to the confirmation value to indicate whether plaintext data from which the definable unit of data was generated was encrypted using the first encryption, the second encryption, or both the first encryption and second encryption.

6. The method of claim 1, further comprising:
modifying the at least one query so that one or more parameters included in the at least one query are encrypted using the first encryption; and
modifying the at least one validating query so that one or more parameters included in the at least one validating query are encrypted using the second encryption.

7. The method of claim 1, further comprising generating the at least one validating query in order to retrieve encrypted data generated from the same plaintext data as encrypted data received in response to the at least one query.

8. The method of claim 7, wherein each of the at least one validating queries is generated by:
selecting one of the at least one queries;
modifying the matching criteria of the validating query to comprise a union of the matching criteria of the selected query and the current matching criteria of the validating query; and
repeating the selecting and modifying operations until a quantity of data expected to be returned in response to the validating query equals or exceeds a constant multiplied by a quantity of data in a union of the data returned in response to the at least one query.

9. A system for confirming the validity of data returned from a data store, the system comprising:
a data store, the data store configured to store a primary data set encrypted using a first encryption and a secondary data set using a second encryption, the secondary data set having fewer units of data than the primary data set;
at least one client configured to issue a query against the data store to retrieve a primary data result belonging to the primary data set; and
a query interface, the query interface configured to:
issue at least one validating query against the data store, each validating query configured to return a secondary data result belonging to the secondary data set;
receive the secondary data result; and
provide a data invalid notification if any definable unit of data included in an unencrypted form of the secondary data result is not contained in an unencrypted form of the primary data result, the definable unit of data satisfying the query, wherein a definable unit of data is any identifiable, discrete subset of a data set.

10. The system of claim 9, wherein the primary data set and secondary data set are stored in a single definable subset of the data store.

11. The system of claim 9, wherein the query interface is further configured to append a confirmation value to the primary data set and secondary data set, the confirmation value indicating whether data from which the definable unit of data was generated was encrypted using the first encryption, the second encryption, or both the first encryption and second encryption.

12. The system of claim 9, wherein the query interface is further configured to generate the at least one validating query; and
wherein the secondary data result resulting from the validating query includes at least one tuple satisfying an unencrypted form of the query.

13. The system of claim 9, wherein a matching criteria in the at least one validating query comprises a superset of a matching criteria in the query.

14. The system of claim 9, wherein the first encryption and the second encryption are order preserving.

15. A computer program product embodied in a non-transitory tangible medium comprising:
computer readable program codes coupled to the non-transitory tangible medium for confirming the validity of data returned from a data store, the computer readable program codes configured to cause the program to:
encrypt a primary data set using a first encryption;
store the encrypted primary data set at the data store;
encrypt a secondary data set using a second encryption, the secondary data set having fewer units of data than the primary data set;
store the encrypted secondary data set at the data store;
encrypt a query, the query configured to return at least one primary tuple belonging to the primary data set;
issue the encrypted query against the data store;
issue at least one validating query against the data store, the validating query configured to return at least one secondary tuple belonging to the secondary data set;
decrypt the at least one secondary tuple; and
provide a data invalid notification if the decrypted form of the at least one secondary tuple satisfying the query is not contained in a decrypted form of any of the primary data results.

16. The computer program product of claim 15, further comprising computer readable program code to cause the program to store the encrypted primary data set and the encrypted secondary data set in a single definable subset of the data store.

17. The computer program product of claim 15, further comprising computer readable program code to cause the program to append a confirmation value to the primary data set and secondary data set, the confirmation value indicating whether the primary tuple and the secondary tuple data were encrypted using the first encryption, the second encryption, or both the first encryption and second encryption.

18. The computer program product of claim 17, further comprising computer readable program code to cause the program to encrypt the confirmation value using one way hashing.

19. The computer program product of claim 15, further comprising computer readable program codes to cause the program to:
modify the query such that one or more parameters included in the query are encrypted using the first encryption; and
modify the at least one validating query such that one or more parameters included in the at least one validating query are encrypted using the second encryption.

20. The computer program product of claim 15, wherein the first encryption and the second encryption are order preserving.

* * * * *